(12) United States Patent
Wokurka

(10) Patent No.: US 8,616,883 B2
(45) Date of Patent: Dec. 31, 2013

(54) SIMULATION CONTROL SYSTEM FOR AN INTEGRATED LIVE AND SIMULATION ENVIRONMENT FOR AN AIRCRAFT

(75) Inventor: John Wokurka, Fenton, MO (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 12/968,494

(22) Filed: Dec. 15, 2010

(65) Prior Publication Data

US 2012/0156653 A1   Jun. 21, 2012

(51) Int. Cl.
*G09B 9/08* (2006.01)

(52) U.S. Cl.
USPC .............................................. 434/35; 434/30

(58) Field of Classification Search
USPC .............. 434/1–71, 219; 73/118.03; 244/220; 342/169
See application file for complete search history.

(56) References Cited

U.S. PATENT DOCUMENTS

| | | | |
|---|---|---|---|
| 4,442,491 A | 4/1984 | Olhausen, Jr. | |
| 4,599,070 A | 7/1986 | Hladky et al. | |
| 5,807,109 A * | 9/1998 | Tzidon et al. .................... | 434/35 |
| 6,106,297 A * | 8/2000 | Pollak et al. ..................... | 434/16 |
| 7,098,913 B1 | 8/2006 | Etherington et al. | |
| 2003/0046396 A1* | 3/2003 | Richter et al. ................. | 709/226 |
| 2006/0178758 A1 | 8/2006 | Koriat | |
| 2007/0264617 A1* | 11/2007 | Richardson et al. ............ | 434/30 |
| 2010/0013927 A1 | 1/2010 | Nixon | |
| 2011/0171611 A1 | 7/2011 | Batcheller et al. | |
| 2011/0313658 A1 | 12/2011 | He | |
| 2012/0204059 A1 | 8/2012 | Preston | |

FOREIGN PATENT DOCUMENTS

| | | |
|---|---|---|
| JP | H08276074 A | 10/1996 |
| WO | 2012082242 A2 | 6/2012 |

OTHER PUBLICATIONS

USPTO U.S. Appl. No. 12/628,831 dated Dec. 1, 2009, pp. 62.
USPTO U.S. Appl. No. 13/304,514 dated Nov. 25, 2011, pp. 78.
USPTO U.S. Appl. No. 12/880,701 dated Sep. 13, 2010, pp. 79.
Lechner et al., "Integrated Live Constructive Technologies Applied to Tactical Aviation Training", Interservice/Industry Training, Simulation, and Education Conference (I/TSEC) 2008, pp. 1-11 http://www.iitsec.org/documents/8147_2008BPnomTrng_Paper.pdf.
U.S. Appl. No. 12/628,831, filed Dec. 1, 2009, Lechner et al.
U.S. Appl. No. 12/880,701, filed Sep. 13, 2010, Sowadski et al.
U.S. Appl. No. 12/628,831, filed Dec. 1, 2009, Mendro et al.
USPTO Office Action dated Apr. 5, 2012 regarding U.S. Appl. No. 12/628,831, 13 pages.
USPTO Final Office Action dated Dec. 21, 2012, for U.S. Appl. No. 13/304,514, 12 pages.
Final Office Action, dated Oct. 25, 2012, regarding USPTO U.S. Appl. No. 12/628,831, 11 pages.
Office Action, dated Aug. 30, 2012, regarding USPTO U.S. Appl. No. 13/304,504, 16 pages.
Office Action, dated Aug. 31, 2012, regarding USPTO U.S. Appl. No. 12/968,494, 11 pages.

(Continued)

*Primary Examiner* — Timothy A Musselman
(74) *Attorney, Agent, or Firm* — Yee & Associates, P.C.

(57) ABSTRACT

A method and apparatus for managing a simulation. Information about the simulation is received over a wireless communications link with a computer system in an aircraft. The information is received during running of the simulation and identifies a performance of the computer system running the simulation. The running of the simulation is controlled based on the performance of the computer system.

19 Claims, 13 Drawing Sheets

(56) References Cited

OTHER PUBLICATIONS

Office Action, dated Jun. 6, 2013, regarding USPTO U.S. Appl. No. 12/628,831, 9 pages.

Notice of Allowance, dated Aug. 23, 2013, regarding USPTO U.S. Appl. No. 13/304,514, 14 pages.

International Search Report and Written Opinion, dated Aug. 12, 2013, regarding Application No. PCT/US2011/058527, 9 pages.

* cited by examiner

SIMULATION CONTROL SYSTEM FOR AN INTEGRATED LIVE AND SIMULATION ENVIRONMENT FOR AN AIRCRAFT

BACKGROUND INFORMATION

1. Field

The present disclosure relates generally to aircraft and, in particular, to a method and apparatus for performing training exercises in an aircraft. Still more particularly, the present disclosure relates to a method and apparatus for performing training exercises in an aircraft in which a live environment and a simulation environment are present.

2. Background

Training exercises are often performed for military aircraft. These training exercises are used to teach pilots how to operate the aircraft. Additionally, the exercises are also used to train the pilots on different strategies and tactics with respect to operating the aircraft. For example, pilots may train in an aircraft to improve skills and reactions to adversarial events. These events may include, for example, without limitation, encountering enemy aircraft, reacting to a presence of surface-to-air missile sites, engaging time sensitive targets, and other suitable events.

A large amount of training may be performed using training devices on the ground. These training devices often take the form of flight simulators. A flight simulator is a system that copies or simulates the experience of flying an aircraft. A flight simulator is meant to make the experience as real as possible. Flight simulators may range from controls and a display in a room to a full-size replica of a cockpit mounted on actuators that are configured to move the cockpit in response to actions taken by a pilot. These types of simulators provide a capability to teach pilots and/or other crew members to operate various aircraft systems and to react to different events.

Additional training is performed through training exercises using live aircraft. These types of training exercises expose pilots to the actual conditions encountered when flying an aircraft. Various conditions cannot be accurately simulated using a flight simulator. For example, the actual movement or forces encountered in flying an aircraft may not be adequately provided through a flight simulator.

With military aircraft, this type of training is typically performed on various areas or ranges. This type of training may involve using multiple live aircraft to perform training on encountering enemy aircraft. Further, various ground platforms also may be used. These ground platforms may include, for example, without limitation, tanks, surface-to-air missile systems, and other suitable ground units. These types of training exercises provide a pilot with the additional experience needed to operate an aircraft in different conditions.

Live training exercises are difficult and/or expensive to set up and operate. For example, to perform a training exercise in the air, airspace is restricted to other aircraft to avoid unintended incursions into the airspace in which the training occurs. Additionally, fuel, maintenance, and other expenses are required to prepare the aircraft for the exercises, operate the aircraft during the exercises, and perform maintenance after the exercises have concluded.

Further, the amount of airspace may be confining and may restrict the type and amount of movement that aircraft can make during a training exercise. Times and locations where airspace can be restricted may limit the amount of time when training exercises can be performed.

Therefore, it would be advantageous to have a method and apparatus that takes into account one or more of the issues discussed above, as well as possibly other issues.

SUMMARY

In an illustrative embodiment, an apparatus comprises a network interface and a first computer system. The network interface is configured to communicate with a number of aircraft. The first computer system is configured to receive information about a simulation over a wireless communications link to the network interface with a second computer system in an aircraft in the number of aircraft. The information is received during running of the simulation and identifies a performance of the second computer system running the simulation. The first computer system is configured to control running of the simulation based on the performance of the second computer system.

In another illustrative embodiment, an aircraft training system comprises a number of aircraft, a network interface, a constructive server computer, and a simulation control server computer. The network interface is configured to communicate with the number of aircraft. The constructive server computer is configured to generate simulation objects for a simulation and send simulation data including the simulation objects to the number of aircraft using the network interface. The simulation control server computer is configured to receive information about the simulation over a wireless communications link to the network interface with a computer system in an aircraft in the number of aircraft. The information is received during running of the simulation and identifies a performance of the computer system running the simulation. The simulation control server computer is configured to control running of the simulation based on the performance of the computer system.

In yet another illustrative embodiment, a method is provided for managing a simulation. Information about the simulation is received over a wireless communications link with a computer system in an aircraft. The information is received during running of the simulation and identifies a performance of the computer system running the simulation. The running of the simulation is controlled based on the performance of the computer system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
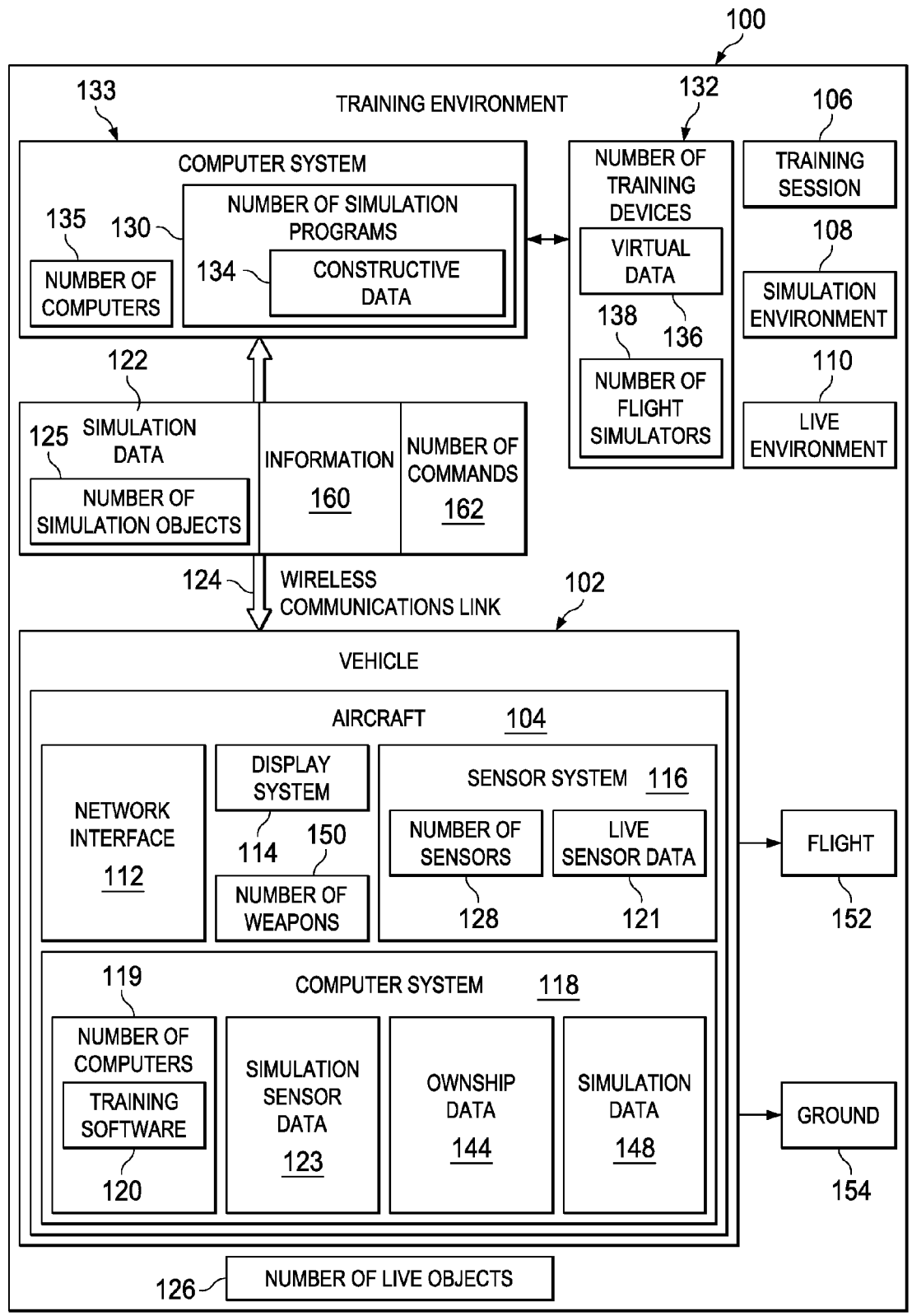
FIG. 1 is an illustration of a block diagram of a training environment in accordance with an illustrative embodiment.

The different illustrative embodiments recognize and take into account a number of considerations. For example, the different illustrative embodiments recognize and take into account that one manner in which training may be performed to reduce the expense and cost involves attaching pods or associating systems with the aircraft that simulate live platforms. These pods may include the hardware and software to simulate the platforms that the pilot may target or interact with.

This type of training simulates weapons that allow aircraft to target live platforms with onboard sensors. These pods also allow weapons to be shot through simulations embedded in the pods. The different illustrative embodiments recognize and take into account that this current type of simulation uses actual hardware or hardware emulations. A hardware emulation is hardware that takes a different form or type from the hardware actually used. A hardware emulation is configured to provide the same response or output as the actual hardware that is being emulated.

Although these types of systems may be useful, the different illustrative embodiments recognize and take into account that the hardware used for this type of simulation may have an undesired level of expense and maintenance.

Thus, the different illustrative embodiments provide a method and apparatus for integrating both live and simulation environments on an aircraft. The different illustrative embodiments provide a pilot and other crew members the capability to train in an actual training environment. This training environment includes both live and simulation objects. Data for the simulation objects is transmitted from other vehicles in the air or on the ground. In one illustrative embodiment, an apparatus comprises an aircraft, a network interface, a display system, a sensor system, and a computer system.

The network interface is configured to exchange data with a number of remote locations using a wireless communications link. The computer system is configured to run a number of processes to receive simulation data received through the network interface over the wireless communications link. The computer system is also configured to run a number of processes to receive live data from the sensor system. The computer system is configured to run a number of processes to present the simulation data with the live data on the display system in the aircraft.

In the different illustrative examples, the simulation data received from the network interface is processed to generate simulation sensor data. This simulation sensor data has the same format as sensor data generated by the sensor system associated with the aircraft. The simulation sensor data is processed by a number of processes running on the computer system to generate the sensor data. In these examples, the processes may take the form of a number of models for the different sensors in the sensor system. Some or all of the sensors may be modeled in these examples.

The sensor data generated by the models may be referred to as simulation sensor data. The sensor data generated by the sensor system may be referred to as live sensor data. The live sensor data and the simulation sensor data are presented together during the training session.

The different illustrative embodiments also recognize and take into account that it is desirable for each training device running a simulation during a training session to run the simulation with the desired level of performance. In other words, it is desirable for a training device, such as a flight simulator or a vehicle, to run the simulation such that the operator of the training device has a training session that performs as near as possible to a real-life experience being modeled by the simulation in the training session.

The different illustrative embodiments recognize and take into account that computer systems for different training devices may have different capabilities. For example, some training devices may have more processor resources, greater memory, or more storage than other training devices. Thus, the different illustrative embodiments recognize and take into account that a simulation run on one training device may require more use of resources than a simulation run on another training device. As a result, some training devices may be unable to provide a desired level of performance, as compared to other training devices. As a result, the training device may not provide a desired experience for the human operator.

This performance may be, for example, the ability to track a desired number of objects in the training session, tracking the objects in the training session, performing operations, and performing other functions as quickly as needed in the simulation to provide as close as possible to a real-world experience. If the training device cannot process a desired number of objects, then the simulation may not provide all of the information desired for the simulation.

As another example, the different illustrative embodiments recognize and take into account that, if the processing of resources available to run the simulation cannot run a simulation as quickly as desired, then the experience given to the operator by the training device may not be as realistic as desired. For example, objects may not move as fast as desired on display screens to the operator, objects may jump from one location to another location, functions initiated by the operator may not occur at the same time as with a real-world initiation of the function outside of the simulation, and other undesired effects may occur.

For example, the different illustrative embodiments recognize and take into account that one manner in which performance is measured in a simulation is the number of entities that can be managed by the computer system for the training device. For example, if 50 objects are present in the simulation, simulation data is sent to the computer system for all 50 objects. A computer system that does not have sufficient resources may be unable to manage all 50 entities. Instead, the computer system may only manage 30 entities. Attempts to manage more entities may result in data being dropped or the computer system lagging or running behind in the simulation, as compared to the simulation being run on other training devices.

Thus, the different illustrative embodiments provide a method and apparatus for managing a simulation. In one illustrative embodiment, information about the simulation is received over a wireless communications link with a computer system in an aircraft. The information is received during the running of the simulation and identifies a performance of the computer system running the simulation. Running of the simulation is controlled based on the performance of the computer system.

With reference now to FIG. 1, an illustration of a block diagram of a training environment is depicted in accordance with an illustrative embodiment. In this illustrative example, training environment 100 includes vehicle 102. Vehicle 102 takes the form of aircraft 104 in these depicted examples. Aircraft 104 is a real or physical aircraft in these examples. In other words, aircraft 104 is not a simulated aircraft that is generated through a computer simulation. Training session 106 may be performed using aircraft 104, in which simulation environment 108 and live environment 110 are both present in training environment 100.

In this illustrative example, network interface 112, display system 114, sensor system 116, and computer system 118 are associated with aircraft 104. A first component may be considered to be associated with a second component by being secured to the second component, bonded to the second component, fastened to the second component, and/or connected to the second component in some other suitable manner. The first component also may be connected to the second component by using a third component. The first component also may be considered to be associated with the second component by being formed as part of and/or an extension of the second component.

Computer system 118 comprises number of computers 119 in this illustrative example. Number of computers 119 may be in communication with each other using wired or wireless communications links in these illustrative examples. Training software 120 runs on number of computers 119 in these illustrative examples. Sensor system 116 generates live sensor data 121. Simulation data 122 is received by network interface 112 over wireless communications link 124.

In these illustrative examples, simulation data 122 may be for number of simulation objects 125. In these illustrative examples, a simulation object is an object created by a computer program or an object represented by a training device. In other words, a simulation object is not a physical object in these examples. In these examples, a training device is a hardware device and not a software device. The training device may run software to run a simulation during a training session.

In these illustrative examples, live sensor data 121 is data generated by sensor system 116 associated with aircraft 104 detecting number of live objects 126 in training environment 100. A live object, as used in these illustrative examples, is a physical or real object. In other words, a live object can be seen, touched, and/or handled. For example, when the live object is an aircraft, the live object is the actual aircraft and not a computer representation of the aircraft or a training device for the aircraft. As used herein, a number of, where referring to items, means one or more items. For example, number of live objects 126 is one or more live objects. In these illustrative examples, number of live objects 126 is detected by number of sensors 128 within sensor system 116.

In these illustrative examples, computer system 118 is configured to run training software 120 during training session 106 using aircraft 104 in these examples. Computer system 118 is configured to run training software 120 in a manner that presents live sensor data 121 and simulation data 122 together on display system 114. In these illustrative examples, training software 120 generates simulation sensor data 123 using simulation data 122 in presenting simulation sensor data 123. As a result, simulation sensor data 123 and live sensor data 121 may be processed to generate information about objects that are live and simulated. In other words, live sensor data 121 may be used to generate information about live objects. Simulation sensor data 123 may be used to generate information about objects that are only simulated and not physically present.

In these illustrative examples, simulation data 122 is data generated by a program running on a computer system or by a training device. For example, training environment 100 also may include at least one of number of simulation programs 130, number of training devices 132, and other suitable systems configured to generate simulation data 122.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these examples, number of simulation programs 130 runs on computer system 133. Computer system 133 comprises number of computers 135. In these illustrative examples, number of simulation programs 130 generates simulation data 122 in the form of constructive data 134.

Number of simulation programs 130 also includes a capability to identify objects that may block a field of view of aircraft 104 and visible objects not blocked by these objects blocking the field of view of aircraft 104. These objects may include, for example, without limitation, terrain, a building, a tree, a ridge, a mountain, another aircraft, and/or other suitable types of objects. The field of view, in these examples, is for a sensor system in aircraft 104. In particular, these objects may be used to generate simulation sensor data 123 to provide information about objects that are simulated in number of simulation programs 130.

The identification of visible objects that are not blocked by objects that block the field of view of aircraft 104 is performed in number of simulation programs 130 on computer system 133 instead of in computer system 118 on aircraft 104. By performing the identification of objects in computer system 133 using number of simulation programs 130, the different illustrative examples reduce the amount of processing resources needed on aircraft 104 to participate in training in training environment 100.

In these illustrative examples, number of simulation programs 130 may identify objects for any vehicle in training environment 100 in addition to aircraft 104. For example, objects may be identified for other physical aircraft. Further, objects also may be identified for number of training devices 132.

Constructive data 134 is data generated by a software program to simulate an object. The object may be, for example, without limitation, an aircraft, a ground vehicle, a missile site, a missile, or some other suitable object.

Number of training devices 132 generates virtual data 136 in simulation data 122. Virtual data 136 is any data generated through the use of number of training devices 132. Number of training devices 132 is any device that may be operated by a human operator. In these illustrative examples, number of training devices 132 may take the form of number of flight simulators 138. In this example, number of flight simulators 138 may be used to generate number of simulation objects 125. Number of simulation objects 125 may be fighter aircraft, transport aircraft, or other suitable types of aircraft in these examples.

In these illustrative examples, number of training devices 132 is in communication with computer system 133. Number of training devices 132 sends virtual data 136 to computer system 133. Computer system 133 takes constructive data 134 and virtual data 136 and sends this data as simulation data 122 to computer system 118 in aircraft 104.

Simulation data 122 may include information about simulation objects. For example, simulation data 122 may include information identifying a location of a simulation object, a heading of a simulation object, an identification of a simulation object, and other suitable information.

In these illustrative examples, computer system 118 also may generate ownship data 144. Ownship data 144 is an example of simulation data 148 that may be generated by computer system 118. Ownship data 144 is data describing aircraft 104. Ownship data 144 is sent to computer system 133 over wireless communications link 124 through network interface 112. Ownship data 144 may include, for example, at least one of a position of aircraft 104, a direction of travel of aircraft 104, a speed of aircraft 104, and other suitable data. Ownship data 144 also may include, for example, data indicating that number of weapons 150 has been fired on aircraft 104. The firing of number of weapons 150 is simulated and not actual firings of number of weapons 150 in this illustrative example. Ownship data 144 includes information about the firing of number of weapons 150.

Computer system 133 receives ownship data 144. Ownship data 144 is used by number of simulation programs 130 and number of training devices 132 to perform training session 106. In these illustrative examples, ownship data 144 is used to represent aircraft 104 as an object in a simulation. Ownship data 144 allows other aircraft, vehicles, and/or objects to interact with aircraft 104 in the simulation. For example, ownship data 144 may be used by number of simulation programs 130 and number of training devices 132 to identify a location of aircraft 104.

This information may be used to determine how number of simulation objects 125 in the simulation interacts with aircraft 104. In other words, ownship data 144 may be used to generate a simulation object for aircraft 104 that can be used within number of simulation programs 130 and/or by number of training devices 132. As one illustrative example, ownship data 144 may be used to identify visible objects within the field of view of sensors in aircraft 104.

In these illustrative examples, training session 106 may be performed while aircraft 104 is in flight 152 and/or on ground 154. In some illustrative embodiments, all of training session 106 for a particular exercise may be performed on ground 154. In some illustrative embodiments, some events may occur while aircraft 104 is on ground 154 prior to taking off in flight 152.

In other illustrative examples, information 160 also may be sent over wireless communications link 124 to computer system 133. Information 160 is information received during training session 106 from training software 120 in these examples. Information 160 is any information that can be used to identify a performance of computer system 118 in aircraft 104 in performing training session 106. Information 160 also may be sent from number of simulation programs 130 to training software 120.

When sent by training software 120, information 160 may include, for example, without limitation, at least one of processor usage, objects tracked, errors occurring in the simulation, memory used, storage used, amount of processor resources used by the simulation, number of objects tracked by the simulation, model run-time usage, onboard network bandwidth usage, radio frequency (RF) wireless bandwidth usage, RF wireless number of dropped packets, RF wireless packet latency, and other suitable types of information.

When sent by number of simulation programs 130, information 160 may provide information for an operator during training session 106. For example, information 160 may include messages for an operator of aircraft 104.

Based on the identification of the performance of computer system 118, training session 106 may be controlled based on the performance of computer system 118. These actions may include number of simulation programs 130 sending number of commands 162 to training software 120 running on computer system 118. In these illustrative examples, the control of training session 106 may include, for example, controlling an amount of simulation data 122 sent to computer system 118 in aircraft 104, changing the manner in which training software 120 runs on computer system 118, and other suitable actions. Other suitable actions may include sending reset commands or restart commands to training software 120 running on computer system 118 to reset or restart the simulation being run by training software 120. In other examples, the actions may include sending a text message via information 160, or informing the crewmember to perform a hard reboot of computer system 118.

The illustration of training environment 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, additional aircraft, in addition to aircraft 104, may be present in training environment 100 for performing training session 106. In yet other illustrative embodiments, number of training devices 132 may be unnecessary with only number of simulation programs 130 being used.

In these illustrative examples, simulation sensor data 123 may be generated in a location other than computer system 118 in aircraft 104. For example, a portion of training software 120 may run on a computer on the ground and generate the simulation sensor data. Simulation sensor data 123 may be transmitted over wireless communications link 124 to network interface 112 in place of or in addition to simulation data 122.

As another example, information about the performance of other computer systems for other training devices may be received and used to control those training devices. For example, information 160 may be received from number of training devices 132. The performance of these training devices may be identified, and training session 106 may be controlled based on this performance.

Figure 2:
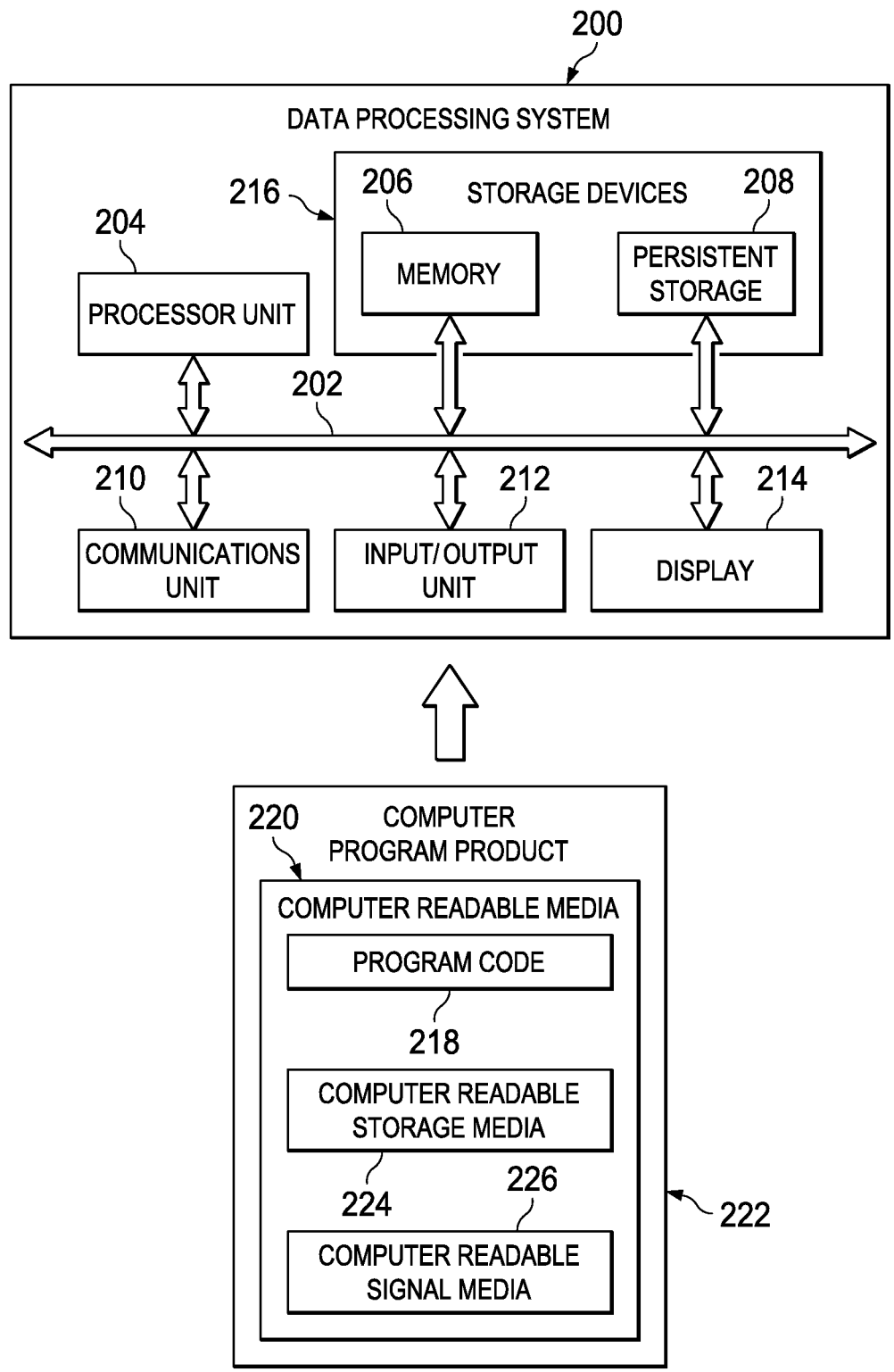
FIG. 2 is an illustration of a data processing system in accordance with an illustrative embodiment.

Turning now to FIG. 2, an illustration of a data processing system is depicted in accordance with an illustrative embodiment. Data processing system 200 is an example of a data processing system that may be used to implement computers, such as number of computers 119 in computer system 118 and number of computers 135 in computer system 133 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200.

Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations.

The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
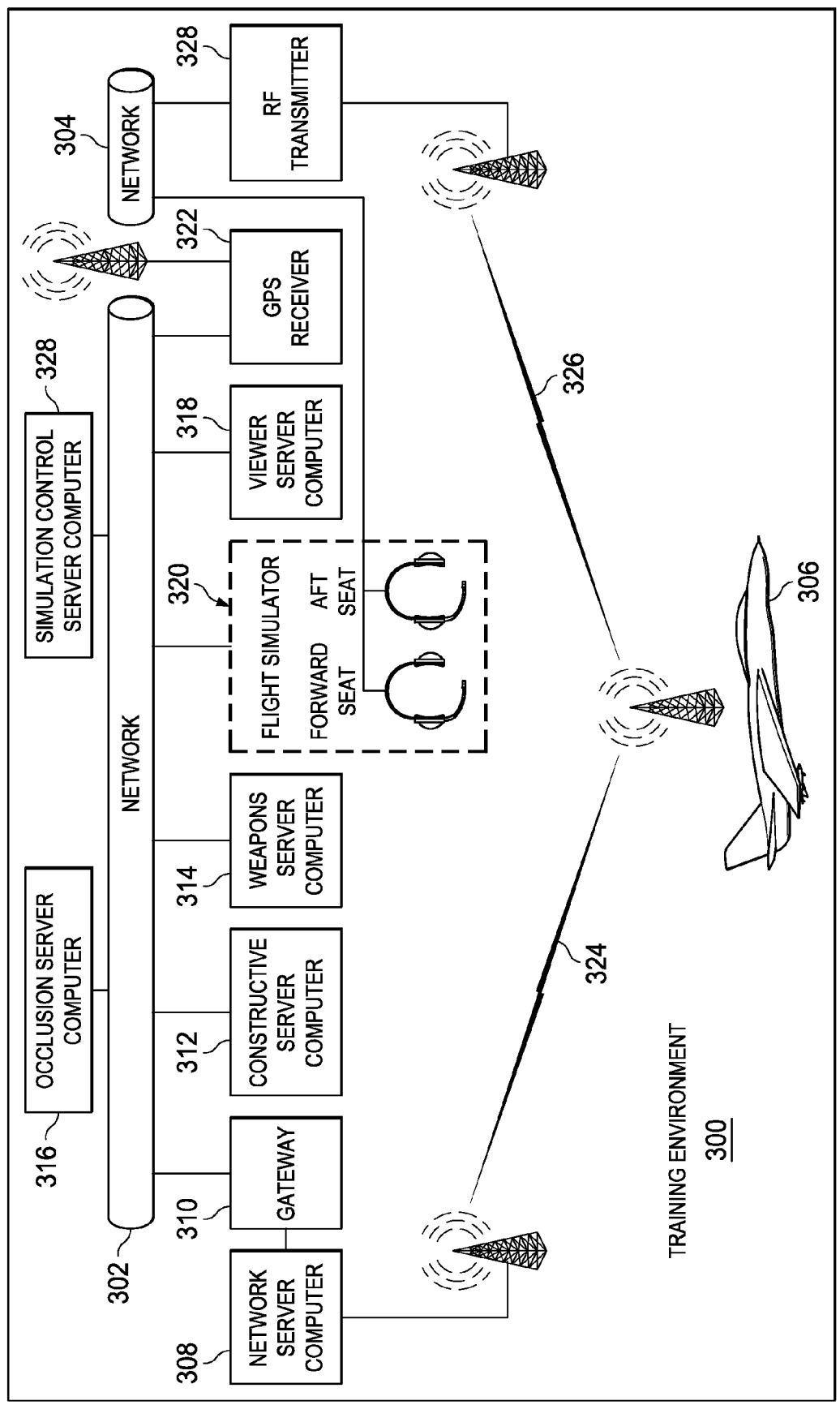
FIG. 3 is an illustration of a training environment in accordance with an illustrative embodiment.

With reference now to FIG. 3, an illustration of a training environment is depicted in accordance with an illustrative embodiment. In this illustrative example, training environment 300 is an example of one implementation for training environment 100 in FIG. 1.

As depicted, training environment 300 includes network 302, network 304, aircraft 306, and network server computer 308. Network 302 includes gateway 310, constructive server computer 312, weapons server computer 314, occlusion server computer 316, viewer server computer 318, flight simulator 320, and global positioning system receiver 322. In these illustrative examples, network server computer 308 exchanges information with aircraft 306. This exchange of information is performed using wireless communications link 324.

Gateway 310 provides a connection between network server computer 308 and other components in network 302. In other words, all information exchanged between network 302 and network server computer 308 flows through gateway 310.

Constructive server computer 312 runs simulations of different objects. These different objects are simulation objects in these examples. For example, constructive server computer 312 may run simulations of other aircraft for the training involving aircraft 306. As another example, constructive server computer 312 may run simulations to generate simulation objects, such as ground vehicles, ground stations, and other suitable objects.

Weapons server computer 314 runs processes to simulate the firing of weapons by aircraft 306. The firing of weapons by aircraft 306, in these examples, is simulation objects for the actual weapons. Weapons server computer 314 processes any indications of weapons fired by aircraft 306 to determine the direction and location of impact for the weapons.

Weapons server computer 314 simulates the weapon in flight and weapon detonation. Weapons server computer 314 publishes information about weapon type, position, velocity, acceleration, and state on network 302. Additionally, weapons server computer 314 also may determine whether a particular object has been damaged or destroyed.

Occlusion server computer 316 identifies objects that may block a portion of a field of view for any aircraft in training environment 300 and visible objects not blocked by these objects. Occlusion server computer 316 is configured to identify the position of aircraft 306. In this illustrative example, aircraft 306 is an aircraft for which objects that are visible in the field of view for aircraft 306 are to be identified. Occlusion server computer 316 identifies any object in the simulation that is visible in the field of view for aircraft 306.

These objects may take various forms. For example, the objects may be terrain such as, for example, a mountain, a ridge, trees, or other suitable types of terrain. Additionally, these objects may be manmade objects, such as a building, a radio transmission tower, or another suitable object. These objects also may be objects in the air, such as other aircraft.

Occlusion server computer 316 generates simulation data for the number of objects in the simulation that have been identified as visible for aircraft 306. In these illustrative examples, the simulation data is for use by aircraft 306 to indicate what simulated objects are visible. For example, a radar system on the aircraft may not detect another aircraft that may be blocked by an object identified by occlusion server computer 316.

This simulation data is sent to aircraft 306 over a network interface. In these depicted examples, the network interface takes the form of network server computer 308.

Viewer server computer 318 provides a capability to view the training that occurs. For example, viewer server computer 318 may display a map identifying the location of different objects including live and simulation objects. Further, viewer server computer 318 also may display results from weapons fire or other events. Viewer server computer 318 may be used during the training session to view events as they occur. Additionally, viewer server computer 318 may be used to provide a debriefing and analysis of the training session after the training session has completed.

In these illustrative examples, global positioning system receiver 322 is used within training environment 300 to create a common time source. Global positioning system receiver 322 may generate information about time. This common time source may be used by other computers and processes to synchronize the performance of different operations. Global positioning system receiver 322 is used to generate a common timestamp that is the same for the different components in training environment 300.

Flight simulator 320 is a flight simulator that may be used to generate virtual data. The simulations performed using constructive server computer 312 and flight simulator 320 is sent through gateway 310 to network server computer 308. The virtual data and the constructive data form simulation data for use by aircraft 306.

Network server computer 308 sends the virtual data and the constructive data to aircraft 306. Further, any data generated by aircraft 306 is returned through network server computer 308 over wireless communications link 324. This information is then sent to network 302 for use by constructive server computer 312, weapons server computer 314, and flight simulator 320.

In these illustrative examples, voice communications, such as those generated by operators of flight simulator 320 or generated by constructive server computer 312, are sent to network 304. In turn, network 304 sends these communications over radio frequency communications link 326 to aircraft 306 using radio frequency (RF) transmitter 328.

In this illustrative example, training environment 300 also may include simulation control server computer 328. Simulation control server computer 328 is in communication with other server computers in training environment 300 using network 302. Simulation control server computer 328 also may communicate with flight simulator 320 and aircraft 306.

In the illustrative examples, simulation control server computer 328 controls the simulations run by various components within training environment 300. These components may include, for example, without limitation, at least one of a server computer, a training device, or some another suitable component. In these illustrative examples, the training device may be, for example, flight simulator 320 and/or aircraft 306.

For example, simulation control server computer 328 may send a number of commands to constructive server computer 312 and weapons server computer 314, as well as other server computers. Additionally, simulation control server computer 328 also may send a number of commands to flight simulator 320 and a computer system in aircraft 306.

The performance of the computer system in aircraft 306 may be identified in a number of different ways in addition to the number of objects that can be managed by aircraft 306. For example, performance of the computer system also may be identified based on whether the simulation is falling behind in the computer system on aircraft 306 as compared to the running of the simulation by another training device, such as flight simulator 320, during the same training session.

The performance of the computer system in aircraft 306 in running the simulation also may be identified based on how fast instructions for the simulation are being processed by the computer system in aircraft 306. Of course, any measurement capable of being used to identify a performance of the computer system in running the simulation may be used.

In these illustrative examples, simulation control server computer 328 is configured to manage a training session by managing simulations run in training environment 300 during the training session. Managing the simulations run in training environment 300 may be performed based on an identification of the performance of simulations running on the training devices.

For example, simulation control server computer 328 may maintain synchronization between simulations run on different components in the training session. For example, simulation control server computer 328 may maintain synchronization between the simulation being run by flight simulator 320 and aircraft 306.

Further, simulation control server computer 328 receives information from at least one of flight simulator 320 and aircraft 306. In these illustrative examples, information received from aircraft 306 may be received over wireless communications link 324 and wireless communications link 326.

Simulation control server computer 328 uses the information received from aircraft 306 to identify a performance of the computer system running the simulation on aircraft 306. Based on the performance identified for aircraft 306, simulation control server computer 328 controls the running of the simulation.

For example, running of the simulation may be performed using a number of different actions. For example, without limitation, simulation control server computer 328 may send a number of commands to constructive server computer 312 or gateway 310 to change the number of objects in the simulation for aircraft 306.

For example, if the performance of the simulation by the computer system in aircraft 306 is not as high as desired, the use of resources in the computer system in aircraft 306 may be greater than possible for running the simulation. As a result, reducing the number of objects managed by the computer system in aircraft 306 may reduce the load such that the simulation runs with a desired level of performance.

In these illustrative examples, a desired level of performance is one in which a training device runs a simulation in which a number of goals of a training session are met. As depicted, a training device in training environment 300 may be aircraft 306 or flight simulator 320. In one illustrative example, the number of goals for a desired performance of the training device is that the operator of the training device has a training session that performs as near as possible to a real-life experience being modeled by the simulation in the training session.

The real-life experience being simulated may take different forms depending on the training session. For example, the experience may be that the operator of the training device performs reconnaissance of objects, real or simulated, on the ground in a manner as near as possible to a real-life reconnaissance mission being modeled by the simulation in the training session. As yet another example, the experience may be that the operator of the training device intercepts hostile targets, real or simulated, in the air and/or on the ground in a manner as near as possible to a real-life mission for intercepting hostile targets being modeled by the simulation in the training session. A combination of these two or other experiences may be used to determine the level of performance desired for the computer system in the training device.

Additionally, simulation control server computer 328 may send commands to aircraft 306 to change the models being used in the simulation. The change in the models being used may be using a different model, removing a model from use, and/or some other suitable change. These models may be, for example, a sensor model, a counter measure model, a communication model, a terrain model, and/or some other suitable type of model. A change in the use of models in the simulation also may reduce the use of resources used by the computer system. Other commands may be sent to reallocate resources in the computer system to the training software running the simulation.

In this manner, the simulation may provide a more realistic or desired experience for the pilot of aircraft 306. Of course, any other action that may reduce the amount of resources used by the computer system to a level that provides a desired experience for the pilot in aircraft 306 may be used.

In some illustrative examples, simulation control server computer 328 may have a display device on which a graphical user interface is presented to a user. The user may view the performance of the running of the simulation by the computer system in aircraft 306. The user also may enter user input to control the running of the simulation.

In yet other illustrative examples, computer software may be present on simulation control server computer 328 to automatically control the running of the simulation based on the performance identified from the information received from aircraft 306. In yet other illustrative embodiments, a combination of a human operator and computer software may be used to monitor the performance and control the running of the simulation by the computer system on aircraft 306.

In this manner, simulation control server computer 328 provides a capability to monitor the different training software run by a computer system on aircraft 306 during a training session. In other words, real-time or near real-time monitoring of simulations and controlling the simulations may be performed through the use of simulation control server computer 328.

The illustration of training environment 300 in FIG. 3 is not meant to imply physical or architectural limitations to the manner in which different illustrative embodiments may be implemented. This particular illustration is an example of one implementation of the manner in which training environment 100 in FIG. 1 may be implemented. In other illustrative embodiments, different components may be used in addition to or in place of the ones illustrated in these examples.

For example, the functions provided by the different server computers may be integrated into fewer numbers of computers or additional computers. In one example, the functions and processes for all of the different server computers illustrated in training environment 300 may be implemented on a single computer.

Further, flight simulator 320 may be a separate device from the computers running the servers in these examples. Flight simulator 320 may include a full-size replica of the cockpit for an operator.

As one example a number of flight simulators is configured to receive simulation data. Constructive server computer 312 is configured to send the simulation data to the number of flight simulators. Simulation control server 328 is configured to control running of simulation running on flight simulator 320 in the number of flight simulators based on the performance of the flight simulator.

Additionally, while occlusion server computer 316 generates simulation data for the number of objects in the simulation that have been identified as visible for aircraft 306 in this illustrative example, this simulation data may also be generated for other types of platforms. The platform may be selected from one of a mobile platform, a stationary platform, a land-based structure, an aquatic-based structure, a space-based structure, and/or some other suitable object. More specifically, the different illustrative embodiments may be applied to, for example, without limitation, a submarine, a bus, a personnel carrier, a tank, a train, an automobile, a spacecraft, a space station, a satellite, a surface ship, a power plant, a manufacturing facility, a building, and/or some other suitable object.

Figure 4:
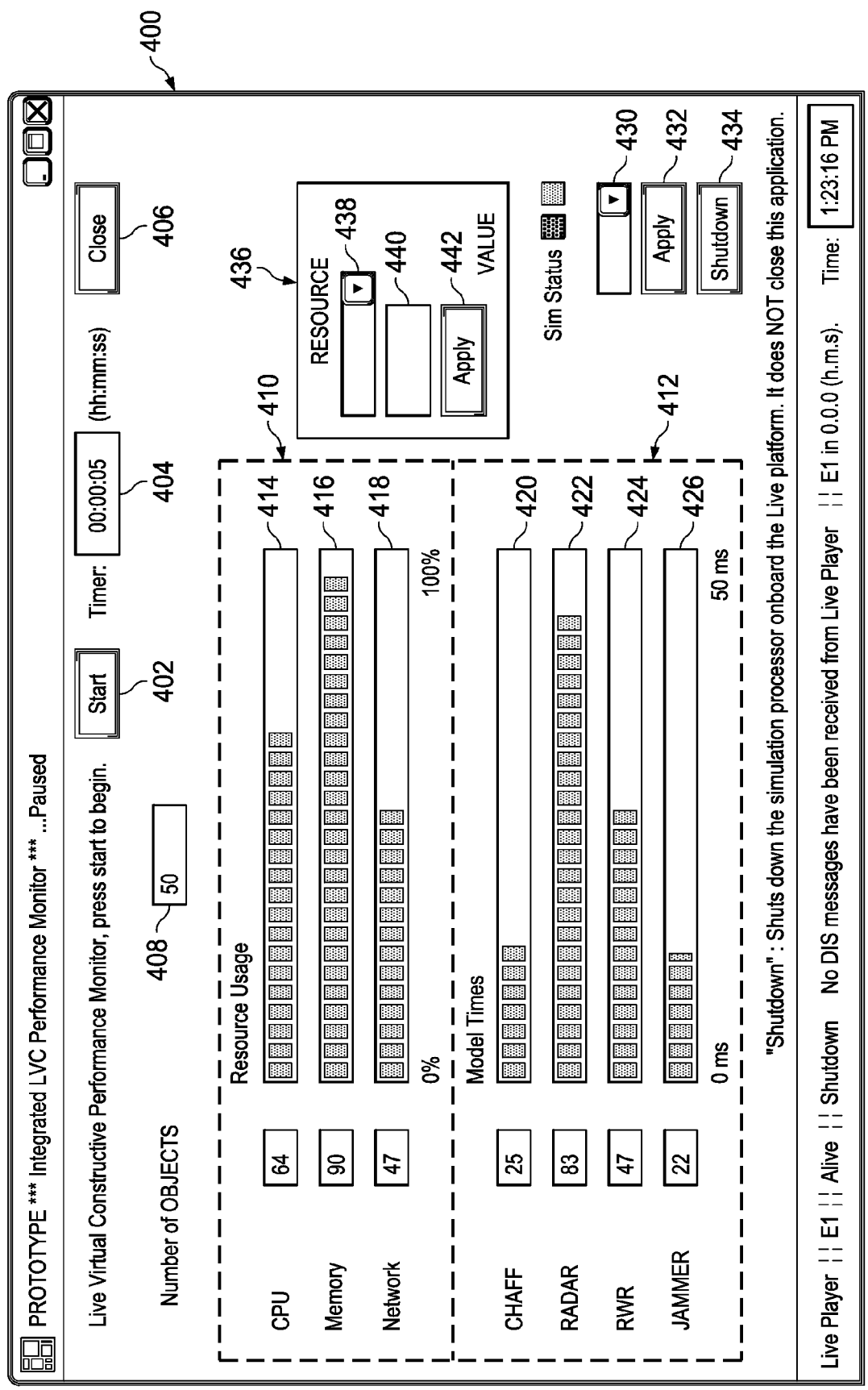
FIG. 4 is an illustration of a graphical user interface for managing a simulation in accordance with an illustrative embodiment.

With reference now to FIG. 4, an illustration of a graphical user interface for managing a simulation is depicted in accordance with an illustrative embodiment. In this illustrative example, graphical user interface 400 is an example of a graphical user interface that may be displayed by simulation control server computer 328 in FIG. 3.

Graphical user interface 400, in this example, may monitor the performance of a training device, such as aircraft 306 in FIG. 3, during a training session. In these illustrative examples, graphical user interface 400 presents information about the training device. This information includes a status of the performance of the training device and other suitable information. Monitoring of a training device may be initiated by selecting start button 402.

Field 404 identifies a timer indicating the time period that has elapsed during monitoring of the training device. Close button 406 may be used to close and discontinue the monitoring of the training device.

In this illustrative example, field 408 identifies the number of objects being managed by the training software being run by the computer system in the training device. Section 410 identifies resource usage in the computer system of the training device. Section 412 identifies the time that models run in the computer system.

In this illustrative example, resource usage is the use of resources by the computer system. Resource usage includes, for example, without limitation, processor use 414, memory use 416, and network use 418. Times in section 412 are for models, such as chaff 420, radar 422, radar warning receiver 424, and jammer 426. These times are processing times for the models. These times provide a measurement of runtime model usage in these depicted examples. In other words, the times measure the amount of time models are run during a frame.

A processing time is the amount of time that the computer system uses in processing the model during a period of time in the training session. In these examples, the period of time may be measured in frames. For example, if training environment 300 in FIG. 3 is running at 20 Hertz, a frame represents 1/20 of a second or 50 milliseconds. A frame is the smallest unit of runtime measurement for a real-time system in these illustrative examples. Models may be processed in response to different events. If the time needed to process the model increases, the amount of resources in the computer system needed to process the model also increases.

The usage in section 410 and times in section 412 are shown numerically and as graphical bars to aid in identifying performance in the simulation. In section 410, resource usage is shown as a percentage. In section 412, model times are shown in actual time. In these examples, the model times are shown in milliseconds.

If usage of a particular resource in the resource usage in section 410 is greater than some selected threshold, then the performance of the simulation may not have a desired level. In these examples, the threshold may be selected based on a particular computer system being used. Further, the threshold also may be selected based on other factors that may affect the performance of the computer system running the simulation. This determination may be performed by an operator and/or by the simulation control server computer.

In these examples, model times in section 412 are also identified based on numbers and graphical indicators identifying the time needed to process the models. If the processing time increases beyond some threshold, then the performance of the computer system may not be at a desired level to provide a desired experience for the simulation.

In the depicted example, graphical user interface 400 also may be used to initiate commands to control the simulator. For example, drop down menu 430 may be used to stop the simulation, restart the simulation, and to synchronize the simulation. The option selected in drop down menu 430 is initiated by selecting apply button 432. The simulation may be shut down on the training device by selecting shut down button 434.

Additionally, resource usage in section 410 also may be changed through resource control section 436. The resource to be controlled may be selected using drop down menu 438. Drop down menu 438 provides options identifying resources that may be controlled for selection by a user.

For example, through drop down menu 438, resources, such as those in the resource usage in section 410, may be selected. Further, the number of objects managed and the models used also may be selected through drop down menu 438. A value may be entered into field 440 for the particular resource selected.

The new value may be applied by selecting apply button 442. Selecting apply button 442 sends an appropriate command to the training device or other element. For example, if the number of objects managed is reduced or changed, the selection of apply button 442 sends a command to a server computer generating objects for the training device. If a change in the amount of processor resources is selected, apply button 442 sends a command to the computer system to change the amount of processor resources made available to the simulation program.

Further, changing model times in section 412 may be initiated through section 412. One change may include discontinuing the usage of a model. In these examples, discontinuing usage of a model in section 412 may be initiated by selecting the model in drop down menu 438 and selecting a value to discontinue usage of the model. Selection of apply button 442 then sends the command to the training device.

As another example, resource control section 436 may be used to control the number of objects sent in data to the aircraft for processing. This feature may reduce the amount of resources used by the computer system in the aircraft.

For example, with the amount of time models run, the best performance in these examples means that the total time to process all models being used is less than about one frame. If the runtimes for the models are greater than the frame, the computer system may be unable to correctly process the data for the simulation. This situation may result in undesired results in the display in the aircraft.

In this case, if a frame equals 50 milliseconds, a possible deterioration in performance may be present based on the runtime for the models in section 412. In this particular example in FIG. 4, times for running models in section 412 is about 177 milliseconds which is greater than 50 milliseconds. Radar 422 takes about 83 milliseconds and radar warning receiver 424 takes about 47 milliseconds.

As a result, models, such as radar 422 and radar warning receiver 424, may require too much processor time to run the model times illustrated in this example. As a result, unacceptable behavior may be seen in the cockpit display. One solution may be to reduce the number of objects being sent to the aircraft for processing.

The illustration of graphical user interface 400 is not meant to imply physical or architectural limitations to the manner in which different illustrative embodiments may be implemented. Graphical user interface 400 is only an example of one implementation for a graphical user interface that may be used in simulation control server computer 328 in FIG. 3.

For example, in some illustrative examples, a different graphical user interface may be employed to control the simulation, while graphical user interface 400 only displays information about performance of the simulation. In still other illustrative examples, other types of graphical indicators, other than bars, may be used to identify resource usage and model times. For example, resource usage and/or model times may be illustrated on a graph or a pie chart.

In still other illustrative examples, other types of information in addition to, or in place of, the number of objects managed, resource usage, and model times may be displayed. Of course, any information that can be used to identify the performance of the computer system on the training device may be used and presented in graphical user interface 400.

Figure 5:
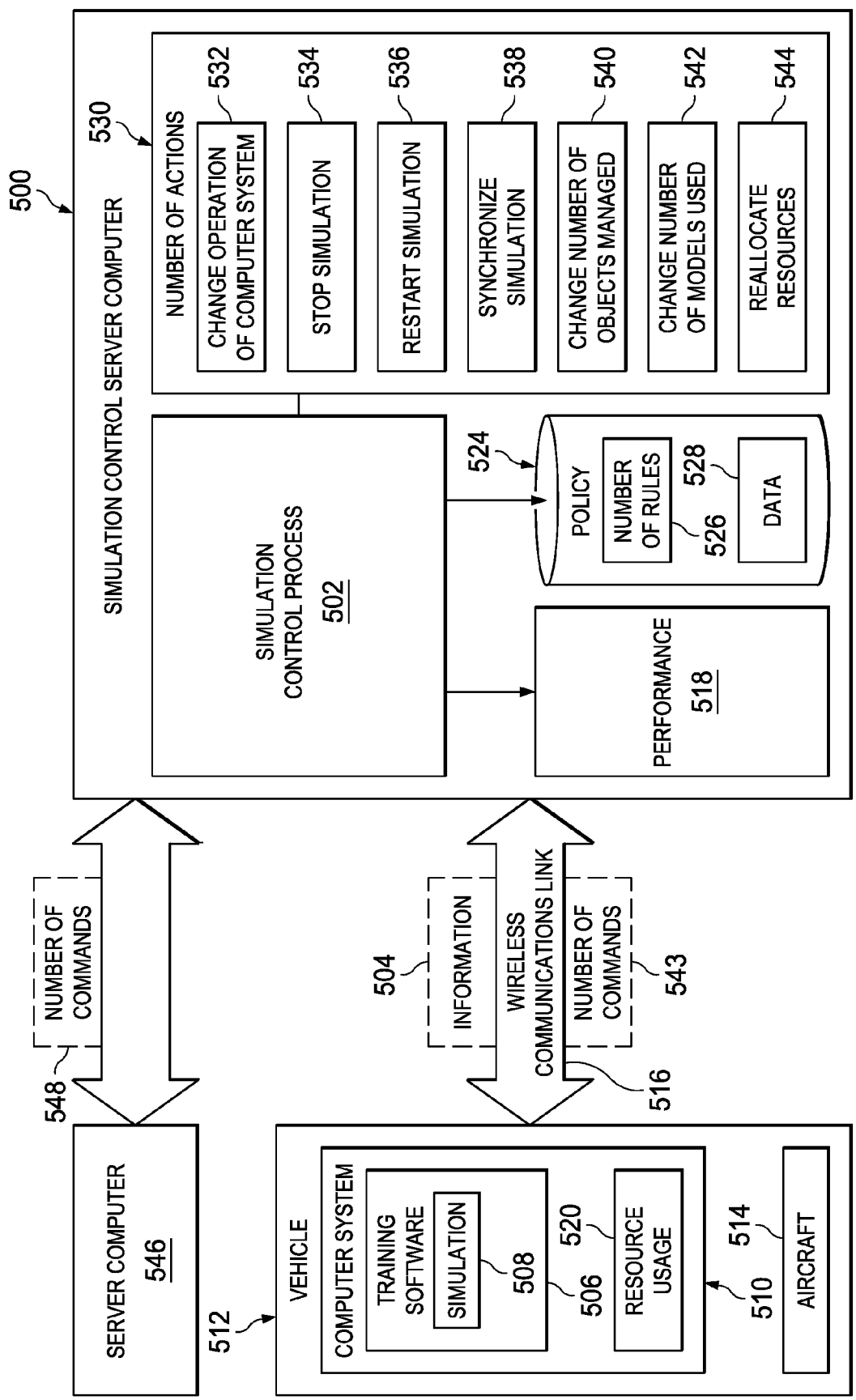
FIG. 5 is an illustration of a simulation control server computer in accordance with an illustrative embodiment.

With reference now to FIG. 5, an illustration of a simulation control server computer is depicted in accordance with an illustrative embodiment. Simulation control server computer 500 is an example of one implementation of simulation control server computer 328 in FIG. 3.

In this illustrative example, simulation control server computer 500 includes simulation control process 502. Simulation control process 502 is an example of a process that may be implemented in number of simulation programs 130 running on computer system 133 in FIG. 1. Simulation control process 502 receives information 504 from training software 506 running simulation 508 on computer system 510. As illustrated, computer system 510 is located in vehicle 512, which takes the form of aircraft 514 in these illustrative examples.

As depicted, information 504 is sent over wireless communications link 516 during the training session. Information 504 is any information that can be used to identify performance 518 of computer system 510 in running simulation 508 using training software 506. In these illustrative examples, performance 518 may include, for example, without limitation, resource use, processing times for models, objects tracked, and other suitable types of information that can be used to identify performance 518.

When performance 518 is identified, simulation control process 502 compares performance 518 with policy 524. Policy 524 comprises number of rules 526, which may be used to determine whether performance 518 is a desired level of performance. Additionally, policy 524 also may include data 528. Data 528 may be data used with number of rules 526 to evaluate performance 518. Data 528 may be, for example, threshold values or other values that may be used with number of rules 526.

In some illustrative examples, simulation control process 502 may be implemented using an artificial intelligence program. With this type of implementation, policy 524 may be unneeded or may be modified by control processes as needed.

If performance 518 is a desired level of performance, no actions may be taken. If performance 518 is not a desired level of performance, number of actions 530 may be identified and/or performed.

Number of actions 530 may take a number of different forms. For example, without limitation, number of actions 530 may include at least one of change operation of computer system 532, stop simulation 534, restart simulation 536, synchronize simulation 538, change number of objects managed 540, change number of models used 542, reallocate resources 544, and other suitable types of operations.

These operations may be initiated by simulation control process 502 sending number of commands 543. Number of commands 543 may be sent to training software 506 and/or to other components within the training session.

Stop simulation 534 and restart simulation 536 may be used to start and stop the running of simulation 508 by training software 506. Synchronize simulation 538 may be used to synchronize simulation 508 being run by training software 506 with other simulations run by other training devices during the training session.

Change number of models used 542 may change the number of models used by training software 506. Changing the number of models may involve using a different model in place of a current model, eliminating the use of the model, or some other suitable change to a model. In these examples, these models may be, for example, sensor models, terrain models, and other suitable types of models. By reducing the number of models used, resource usage 520 may be reduced in a manner that increases performance 518 to a desired level for performance 518.

The change models used are selected by simulation control process 502, rather than by training software 506 on computer system 510 in these examples. For example, if the change in the number of models involves halting usage of a particular model, the action may involve simulation control process 502 sending a stop command to stop use of that model. If a different model is to be used, then simulation control process 502 sends a stop command for the model to be discontinued and then sends a start command for the new model to be used for training software 506. In some cases, the determination of the model or models affected could be made by training software 506.

In the different illustrative examples, the desired level may be a level that provides a realistic experience to the operator of vehicle 512. For example, when simulation 508 has a desired level of performance when being run by training software 506 in computer system 510, objects that are simulated may move as expected in real life. Further, when functions are initiated, those functions also may perform as expected in real-life operations. In some cases, it may be desirable to remove or disable a function and discontinue use of the model to increase processing resources such that other functions may perform as desired.

As an example, server computer 546 sends information about objects to training software 506. Server computer 546 may receive number of commands 548 from simulation control process 502 to reduce the information sent to training software for the objects and/or reduce the number of objects tracked by training software 506 in aircraft 514. As a result, the simulation data may include less data about a fewer number of objects.

Reallocate resources 544 may allocate more resources to the simulation from other processes that may not be needed for the training session. These resources may include, for example, without limitation, at least one of processor resources, memory, storage, and other suitable types of resources.

In these illustrative examples, information 504 may be sent to simulation control process 502 in a compressed form. In other words, information 504 is compressed to data packet units that are as small as possible. The compression of information 504 is performed to reduce the use of bandwidth over the network through which the different computer systems communicate.

The illustration of simulation control server computer 500 is only intended as an example of one implementation for simulation control server computer 328 in FIG. 3.

Figure 6:
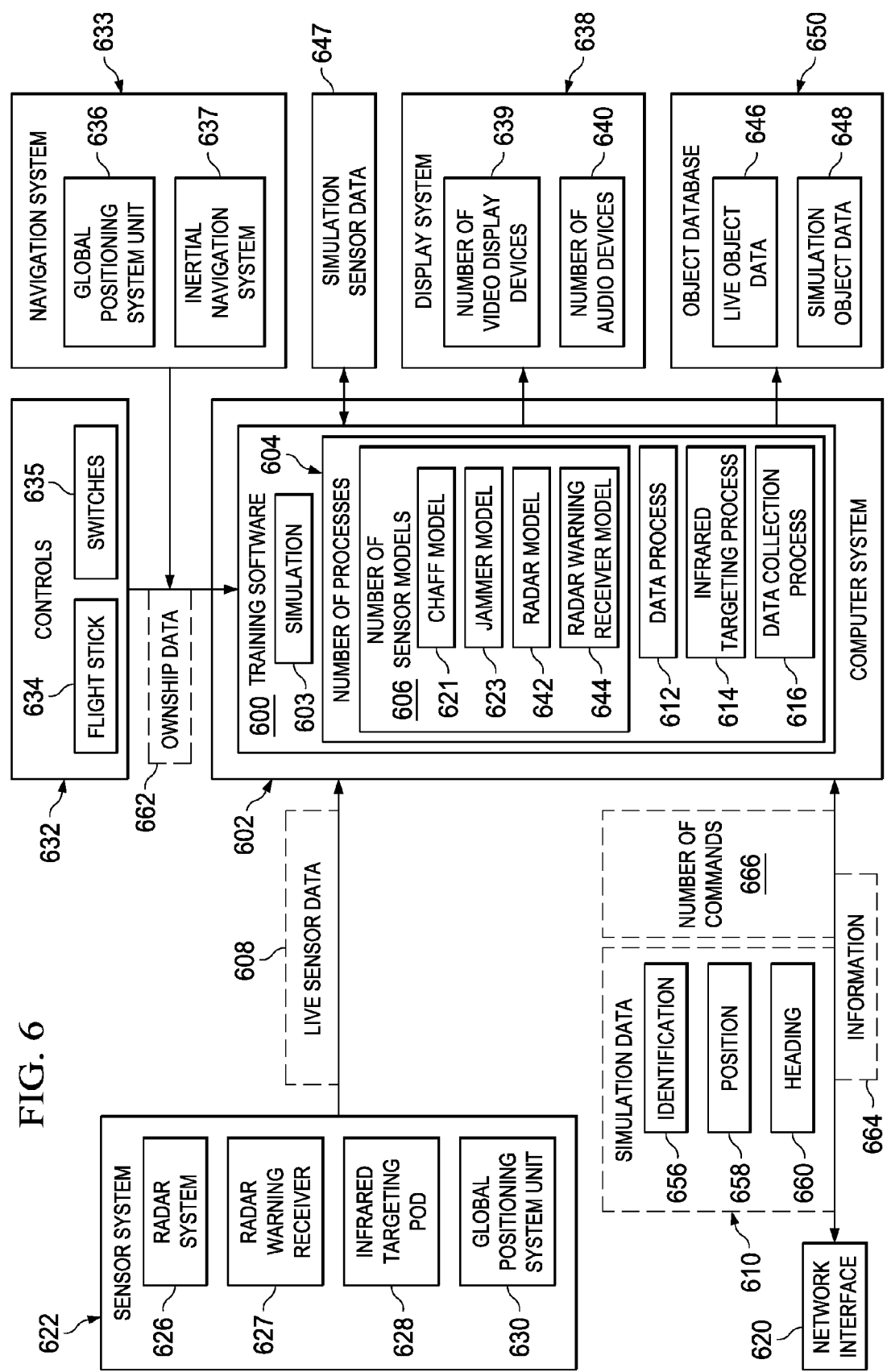
FIG. 6 is an illustration of training software in accordance with an illustrative embodiment.

With reference now to FIG. 6, an illustration of training software is depicted in accordance with an illustrative embodiment. In this illustrative example, training software 600 is an example of one implementation for training software 120 in FIG. 1. As illustrated, training software 600 runs on computer system 602 during a training session. In these illustrative examples, computer system 602 may be a number of computers.

In the illustrative examples, training software 600 may be loaded onto computer system 602 to run training exercises. Computer system 602 may be implemented using data processing system 200 in FIG. 2 and is an example of one implementation for computer system 118 in FIG. 1. Training software 600 runs on computer system 602 to run simulation 603. Simulation 603 runs during a training session for the vehicle in which computer system 602 is located.

Training software 600 comprises number of processes 604. Number of processes 604 may include number of sensor models 606. As illustrated, number of processes 604 includes data process 612, infrared targeting process 614, and data collection process 616. In these illustrative examples, number of processes 604 may process live sensor data 608 and simulation data 610. Number of processes 604 receives simulation data 610 from network interface 620.

Live sensor data 608 is received from sensor system 622. Sensor system 622, in these illustrative examples, may include at least one of radar system 626, radar warning receiver 627, infrared targeting pod 628, global positioning system unit 630, and other suitable components.

In these illustrative examples, number of processes 604 also may receive ownship data 662 from controls 632 and navigation system 633. As depicted, controls 632 may comprise at least one of flight stick 634, switches 635, and other suitable controls that may be located within the aircraft. Navigation system 633 may include at least one of global positioning system unit 636, inertial navigation system 637, and other suitable types of systems.

In these depicted examples, number of processes 604 combine live sensor data 608 and simulation data 610 for presentation on display system 638. Display system 638 may include, for example, number of video display devices 639 and number of audio devices 640. Display system 638 is the display system used in the aircraft and does not require modifications in the different illustrative embodiments.

Number of sensor models 606 provides models of the physical sensors located in sensor system 622. In these different illustrative embodiments, number of sensor models 606 processes simulation data 610 to generate simulation sensor data 647.

Number of sensor models 606 includes chaff model 621, radar model 642, radar warning receiver model 644, and jammer model 623. A model, in these illustrative examples, is a process that is designed to simulate a live or physical object. For example, chaff model 621 is designed to simulate a radar countermeasure. Radar model 642 is designed to simulate the operation of radar system 626. Radar warning receiver model 644 is designed to simulate the operation of radar warning receiver 627. Jammer model 623 is designed to simulate emissions used to jam radar and other types of sensors.

Radar model 642 and radar warning receiver model 644 generate output that is the same or substantially the same as the output generated by radar system 626 and radar warning receiver 627, respectively.

In this illustrative example, infrared targeting process 614 in number of processes 604 receives live sensor data 608 from infrared targeting pod 628. Additionally, infrared targeting process 614 may receive information about objects in simulation data 610. In this illustrative example, infrared targeting process 614 adds data to live sensor data 608 based on information in simulation data 610.

In this example, the data generated by infrared targeting process 614 also is part of simulation sensor data 647 in these examples. For example, infrared targeting process 614 may add symbols to live sensor data 608 from infrared targeting pod 628 to simulate various objects, such as aircraft, missiles, ground radar, and other objects.

Data process 612 in number of processes 604 receives simulation sensor data 647 and live sensor data 608. In these illustrative examples, data process 612 generates live object data 646 and simulation object data 648. Live object data 646 is information about real or physical objects detected by sensor system 622. Simulation object data 648 also may be generated by infrared targeting process 614 processing live sensor data 608 to create simulation object data 648.

Simulation object data 648 is information generated about simulation objects received in simulation sensor data 647. This information may include, for example, without limitation, an identification of an object, a graphical identifier to use with the object, and other suitable information.

Also, in these different illustrative examples, simulation object data 648 may include identifiers or flags to indicate that the particular object is a simulation object and not a live or physical object. This information may be used to generate graphical indicators such that an operator can determine which objects are live or simulated. In these examples, the graphical indicators may be presented on number of video display devices 639 in display system 638. Live object data 646 and simulation object data 648 form object database 650.

In these illustrative examples, data process 612 generates live object data 646 from live sensor data 608 received from sensor system 622. For example, objects detected by radar system 626 are identified and processed by data process 612. Each identified object forms an object within live object data 646.

In these illustrative examples, simulation data 610 may include identification 656, position 658, and heading 660 for a simulation object. Radar model 642 may use this information as input to generate simulation sensor data 647. In a similar fashion, simulation data 610 may be processed by data process 612 using radar warning receiver model 644 to generate simulation sensor data 647 for the simulation object as being a friend or foe.

In the depicted examples, data process 612 uses live object data 646 and simulation object data 648 in object database 650 as a single presentation on display system 638. In other words, both live objects and simulation objects are presented and interacted with by an operator of the aircraft such that both live sensor data 608 and simulation data 610 are presented together in an integrated presentation.

In these illustrative examples, live object data 646 and simulation object data 648 may be presented on display system 638. This information may be presented on number of video display devices 639 to provide an operator an indication of where different objects may be located relative to the aircraft. Further, number of audio devices 640 also may be used to present live object data 646 and simulation object data 648 from object database 650. In some cases, audio warnings or messages may be presented based on information in object database 650.

Data collection process 616 may receive ownship data 662 from controls 632 and from navigation system 633. For example, data collection process 616 may receive an indication of a firing of a weapon in response to an activation of a control in controls 632. Additionally, data collection process 616 receives position information from global positioning system unit 636 and inertial navigation system 637.

This information is sent back as ownship data 662 to a remote location through network interface 620. Ownship data 662 is used by simulation programs and training devices, such as number of simulation programs 130 and number of training devices 132 in FIG. 1. Ownship data 662 may be used to represent the aircraft as an object within the simulations run by number of simulation programs 130 and number of training devices 132 in FIG. 1.

In these illustrative examples, training software 600 sends information 664 to network interface 620. Information 664 may be used by simulation control server computer 328 in FIG. 3 to control the running of simulation 603 by training software 600.

In these illustrative examples, information 664 is any information that may be used to identify the performance of computer system 602 in running simulation 603. Information 664 is sent during the training session while simulation 603 is running. Information 664 is sent in response to an event. The event may be a periodic event, such as a timer, or another event, such as a request for information, a change in use of resources, or some other suitable event. For example, the event can be a variable or a set frequency rate. For example, the event could be at each time five milliseconds pass or the event could be a variable passage of time.

In these illustrative examples, training software 600 may receive number of commands 666. Number of commands 666 may be used to change the use of resources in computer system 602.

The illustration of training software 600 in FIG. 6 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, some processes in number of processes 604 and number of sensor models 606 may run on a different computer, other than computer system 602 in the aircraft. In yet other illustrative embodiments, number of sensor models 606 may be unnecessary if simulation data 610 includes simulation object data 648 for use by number of processes 604. Simulation object data 648 may be sent as part of simulation data 610 if sufficient bandwidth is present for use by network interface 620. In other words, the different models for the sensor system in the aircraft may be run in a remote location with that sensor data being sent to computer system 602 for processing and presentation.

Object database 650 may be transmitted to a remote location using network interface 620 during the training. In some illustrative embodiments, object database 650 may be downloaded after the flight is completed. Object database 650 may be reviewed to evaluate the training that was performed.

As another example, although the illustrative example shows radar model 642 and radar warning receiver model 644, other models also may be used in addition to or in place of the ones depicted. For example, these models may include an Interrogator Friend or Foe model, a chaff and flair dispenser model, an electronic warfare jamming model, and/or other suitable models.

Figure 7:
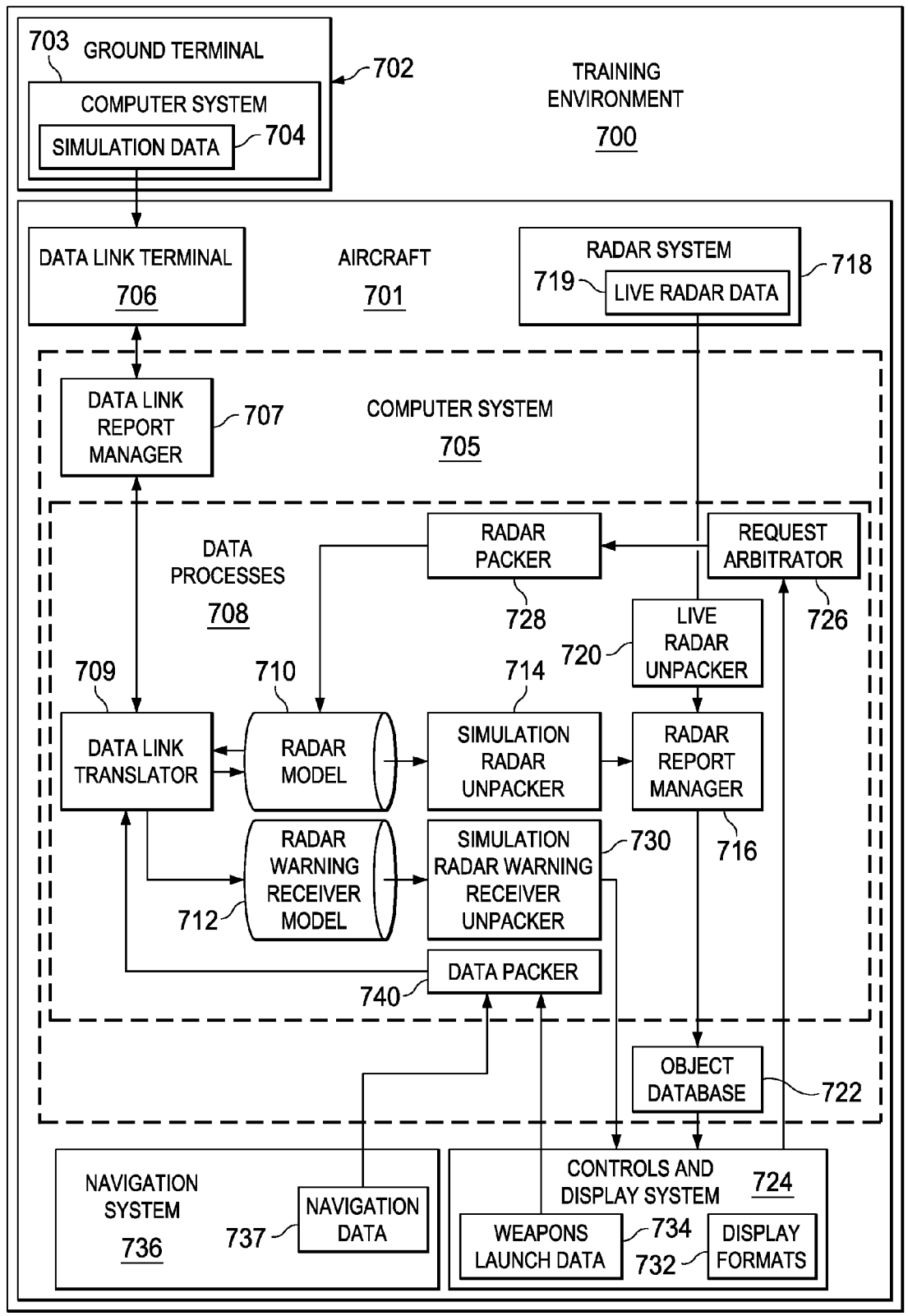
FIG. 7 is an illustration of data flow in a training environment in accordance with an illustrative embodiment.

With reference now to FIG. 7, an illustration of data flow in a training environment is depicted in accordance with an illustrative embodiment. In this illustrative example, training environment 700 is an example of one implementation of training environment 100 in FIG. 1. Further, training environment 700 may be implemented using training software 600 in FIG. 6. The data flow illustrated in this example is for processing simulation data and live data for aerial objects that may be encountered by an aircraft.

As depicted, training environment 700 includes aircraft 701 and ground terminal 702. Ground terminal 702 has computer system 703 for sending simulation data 704 to aircraft 701. Simulation data 704 is sent using a wireless communications link in this illustrative example. Simulation data 704 is received by aircraft 701 using data link terminal 706. Data link terminal 706 may take the form of an avionics device configured to generate and receive different types of data in these examples.

Data at data link terminal 706 is sent to data link report manager 707 running on computer system 705 in aircraft 701. Data link report manager 707 identifies simulation data 704 received from data link terminal 706 and sends simulation data 704 to data processes 708 for processing. In these illustrative examples, data link terminal 706 and data link report manager 707 form a network interface, such as network interface 620 in FIG. 6, between computer system 703 and computer system 705.

Simulation data 704 is sent from data link report manager 707 to data link translator 709. Data link translator 709 is a process in data collection process 616 in FIG. 6 in these illustrative examples. Data link translator 709 separates the simulation data into arrays of simulation data. A portion of these arrays of simulation data is sent into radar model 710, and a portion of these arrays of simulation data is sent into radar warning receiver model 712. The portion of the arrays of simulation data sent into radar model 710 may include information, such as, for example, simulation object information and/or other suitable information. The portion of the arrays of simulation data sent into radar warning receiver model 712 may include information, such as, for example, simulation information about radar emission sources external to aircraft 701.

Radar model 710 generates simulation sensor data. This simulation sensor data is sent to simulation radar unpacker 714. The simulation sensor data may have a format similar to or substantially the same as a format for radar system 718 in aircraft 701. Simulation radar unpacker 714 changes the format of the simulation sensor data into a format for storage in object database 722.

In this illustrative example, radar system 718 generates live radar data 719. Live radar data 719 is sent to live radar unpacker 720 in data processes 708. Live radar unpacker 720 changes the format of live radar data 719 into a format for storage in object database 722. As depicted, both simulation radar unpacker 714 and live radar unpacker 720 send the data with the changed format to radar report manager 716.

Radar report manager 716 identifies simulation object data and live object data for storage in object database 722 and then stores this data in object database 722. Both the simulation object data and the live object data may have substantially the same format in these examples. In some illustrative embodiments, the simulation object data may be associated with an identifier to identify the data as simulation data and not live data.

The data stored in object database 722 may be sent to controls and display system 724. In other words, an operator may control and view the simulation object data and live object data stored using controls and display system 724.

In this depicted example, radar warning receiver model 712 generates simulation sensor data that is sent to simulation radar warning receiver unpacker 730. Simulation radar warning receiver unpacker 730 changes the format of the simulation sensor data and sends the data with the changed format to controls and display system 724. The format of the data is changed such that the data may be controlled and viewed using controls and display system 724.

Controls and display system 724 may be implemented using controls 632 and/or display system 638 in FIG. 6. Further, controls and display system 724 may display the simulation object data and live object data using display formats 732. Display formats 732 may include, for example, without limitation, heads-up display formats, heads-down display formats, and/or other suitable types of formats.

In this illustrative example, an operator may send a request to request arbitrator 726 using controls and display system 724. This request may be, for example, a request to change a component, data, or some other feature of radar model 710. Request arbitrator 726 determines whether the request should be sent to radar model 710.

Request arbitrator 726 uses a set of rules and/or a set of priorities for operations performed by radar model 710 to determine whether the request should be sent to radar model 710. As one illustrative example, if a request has a lower priority than an operation being performed by radar model 710, the request is not sent to radar model 710 until the completion of the operation. If the request is sent to radar model 710, request arbitrator 726 sends the request to radar packer 728. Radar packer 728 changes the format of the request into a format that radar model 710 may process.

Data processed using data processes 708 also is sent back to ground terminal 702 from aircraft 701. For example, weapons launch data 734 may be generated using the data presented using controls and display system 724. Weapons launch data 734 is sent to data packer 740. Data packer 740 also receives navigation data 737 generated by navigation system 736.

Data packer 740 changes the format of the data into a format for transmission to computer system 703. The data is sent to data link translator 709 along with simulation sensor data from radar model 710. This data is then sent to data link report manager 707 and then to data link terminal 706. The data is transmitted from data link terminal 706 to computer system 703 in ground terminal 702 using a wireless communications link.

Figure 8:
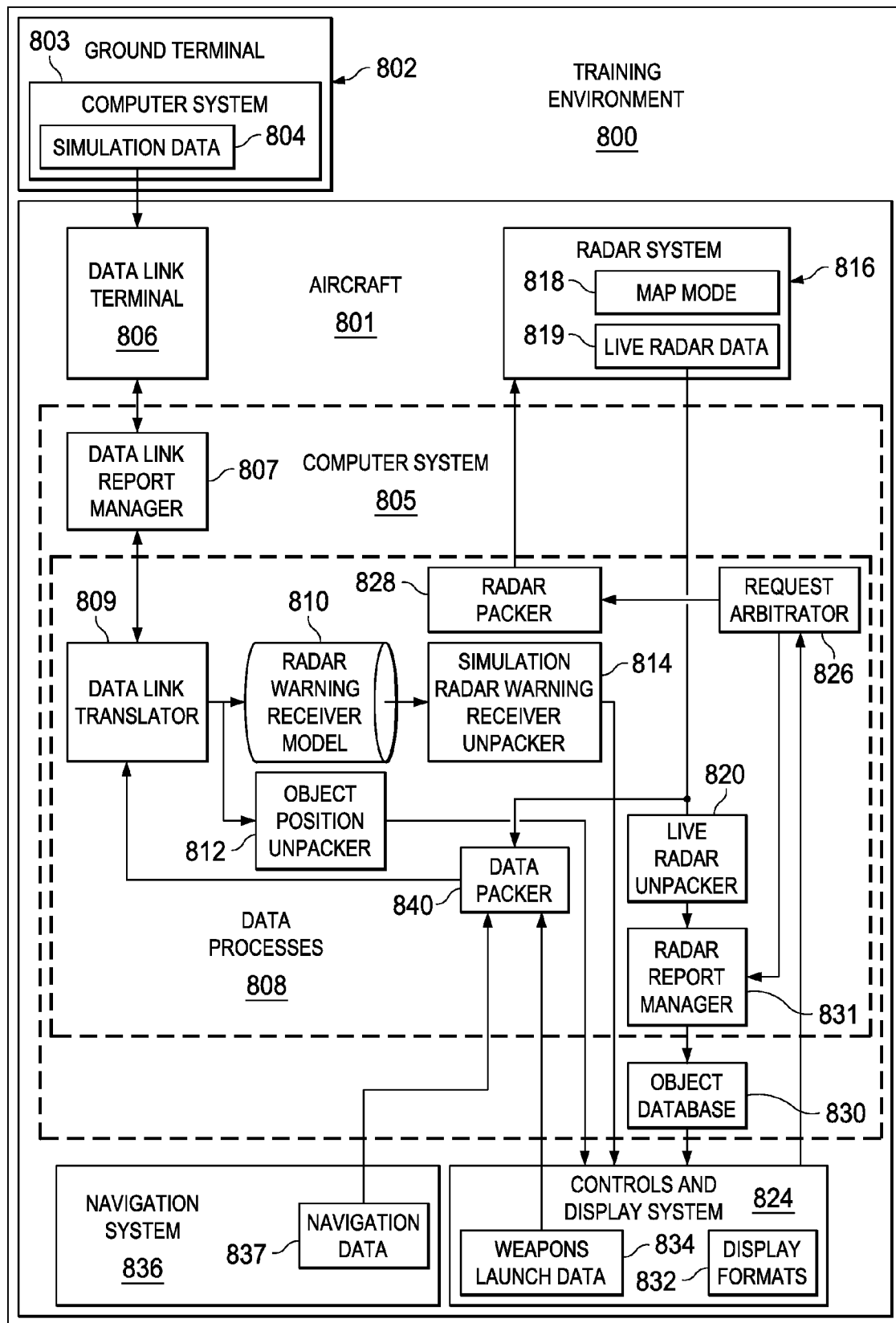
FIG. 8 is an illustration of data flow in a training environment in accordance with an illustrative embodiment.

With reference now to FIG. 8, an illustration of data flow in a training environment is depicted in accordance with an illustrative embodiment. In this illustrative example, training environment 800 is an example of one implementation of training environment 100 in FIG. 1. Further, training environment 800 may be implemented using training software 600 in FIG. 6. The data flow illustrated in this example uses components and processes similar to the data flow illustrated in FIG. 7. However, in this illustrative example, training environment 800 is for processing simulation data and live data for ground-based objects that may be encountered by an aircraft.

As depicted, training environment 800 includes aircraft 801 and ground terminal 802. Ground terminal 802 has computer system 803 for sending simulation data 804 to aircraft 801. Simulation data 804 is sent using a wireless communications link in this illustrative example. Simulation data 804 is received by aircraft 801 using data link terminal 806. Data at data link terminal 806 is sent to data link report manager 807 running on computer system 805 in aircraft 801. Data link report manager 807 identifies simulation data 804 received from data link terminal 806 and sends simulation data 804 to data processes 808 for processing.

Simulation data 804 is sent from data link report manager 807 to data link translator 809. Data link translator 809 separates simulation data 804 into arrays of simulation data. A portion of these arrays of simulation data is sent into radar warning receiver model 810. Another portion of these arrays of simulation data is sent to object position unpacker 812.

The portion of arrays of simulation data sent to object position unpacker 812 contains position data for simulation objects. In this illustrative example, these simulation objects are ground-based objects. Object position unpacker 812 changes the format of the arrays of simulation data such that the position data for the simulation objects may be controlled and viewed using controls and display system 824.

In this depicted example, radar warning receiver model 810 generates simulation sensor data from the arrays of simulation data. The simulation sensor data is sent to simulation radar warning receiver unpacker 814. Simulation radar warning receiver unpacker 814 changes the format of the simulation sensor data and sends the data with the changed format to controls and display system 824. The format of the data is changed such that the data may be controlled and viewed using controls and display system 824.

In this illustrative example, an operator may use the position data for the simulation objects presented in controls and display system 824 to select a simulation object to be monitored using radar system 816. The operator may send a request to request arbitrator 826 based on the selected simulation object. This request may be to change radar system 816 to map mode 818. Map mode 818 allows radar system 816 to monitor a particular area based on the position data for the selected simulation object. In other words, map mode 818 allows radar system 816 to monitor an area for a simulation object without identifying the simulation object or the specific position of the simulation object.

Request arbitrator 826 determines whether this request should be sent to radar system 816. This determination may be based on a set of rules and/or a set of priorities for operations performed by radar system 816. If the request is sent to radar system 816, request arbitrator 826 sends the request to radar packer 828. Radar packer 828 changes the format of the request to a format that may be processed by radar system 816. In this illustrative example, radar packer 828 changes the format of the request to a command that may be executed by radar system 816.

In response to receiving the request with the changed format from radar packer 828, radar system 816 changes to map mode 818 and sends live radar data 819 to live radar unpacker 820. Live radar data 819 is a map of a particular area identified using the position data for the selected simulation object. Live radar unpacker 820 changes the format of live radar data 819 into a format for storage in object database 830. As depicted, live radar unpacker 820 sends the data with the changed format to radar report manager 831.

Further, request arbitrator 826 also sends data included in the request from the operator to radar report manager 831. This data may include information identifying the selected simulation object and/or the position data for the simulation object. Radar report manager 831 identifies simulation object data and live object data for storage in object database 830 and then stores this data in object database 830. In these illustrative examples, simulation object data and the live object data have substantially the same format.

The data stored in object database 830 is sent to controls and display system 824. In other words, an operator may control and view the simulation object data and live object data stored using controls and display system 824.

Controls and display system 824 displays the simulation object data and live object data using display formats 832. Display formats 832 may include, for example, without limitation, heads-up display formats, heads-down display formats, and/or other suitable types of formats.

Data processed using data processes 808 also is sent back to ground terminal 802 from aircraft 801. For example, weapons launch data 834 may be generated using the data presented using controls and display system 824. Weapons launch data 834 is sent to data packer 840. Data packer 840 also receives navigation data 837 generated by navigation system 836.

Further, data packer 840 receives live radar data 819 from radar system 816. Data packer 840 changes the format of all the data received into a format for transmission to computer system 803. The data is sent to data link translator 809. This data is then sent to data link report manager 807 and then to data link terminal 806. The data is transmitted from data link terminal 806 to computer system 803 in ground terminal 802 using a wireless communications link.

Figure 9:
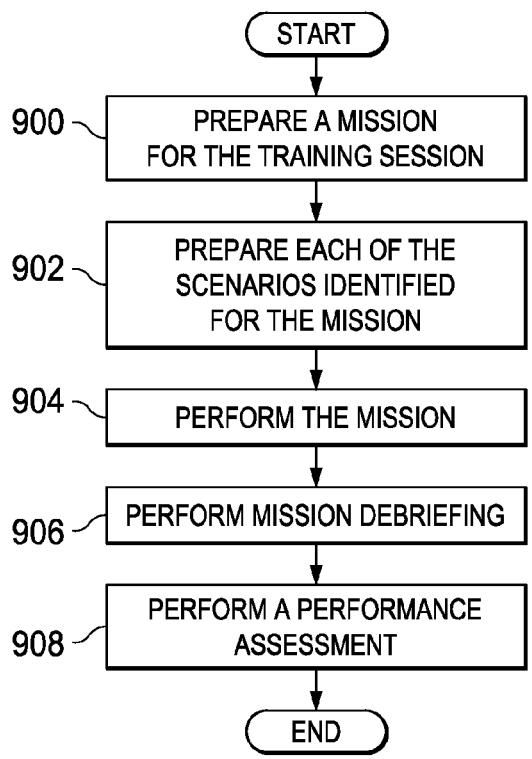
FIG. 9 is an illustration of a flowchart of a process for performing a training session in accordance with an illustrative embodiment.

With reference now to FIG. 9, an illustration of a flowchart of a process for performing a training session is depicted in accordance with an illustrative embodiment. The process illustrated in FIG. 9 may be used to perform training session 106 in training environment 100 in FIG. 1.

The process begins by preparing a mission for the training session (operation 900). In this operation, a mission may be defined to have a number of different scenarios for the training session. These scenarios may include, for example, without limitation, an air-to-air engagement scenario, an air-to-ground strike scenario, a joint-operation scenario including other aircraft, and other suitable scenarios. With one or more of the different illustrative embodiments, multiple scenarios may be performed in a training session that may require more time, airspace, and equipment availability than possible to perform in a single training session or flight.

In this operation, the definition of a training area, the aircraft armament, sensor parameters, behavior, routes, and other information may be set. The process then prepares each of the scenarios identified for the mission (operation 902). This operation includes defining the various parameters and equipment to be used in each scenario in the mission as planned in operation 900. The operation may include identifying both live objects, as well as simulation objects.

The process performs the mission (operation 904). In performing the mission, the data for the different scenarios is loaded onto the computer system for the training environment. Operation 904 may be implemented using training software, such as training software 600 in FIG. 6. The number of live aircraft in the mission may then take off to perform the mission with simulation data being sent to the number of live aircraft. Further, during the flying of the mission, different scenarios may be repeated and rerun until desired results are obtained or until fuel becomes low.

Thereafter, mission debriefing is performed (operation 906). In this operation, information from the mission is presented for review and analysis. For example, the database from the aircraft in the mission, as well as simulation data generated by the computer system, may be viewed. For example, flight paths and events that occurred during the mission may be viewed. Thereafter, a performance assessment is performed (operation 908), with the process terminating thereafter. An assessment of the performance of the crew in the aircraft may be performed based on the results from the mission.

Figure 10:
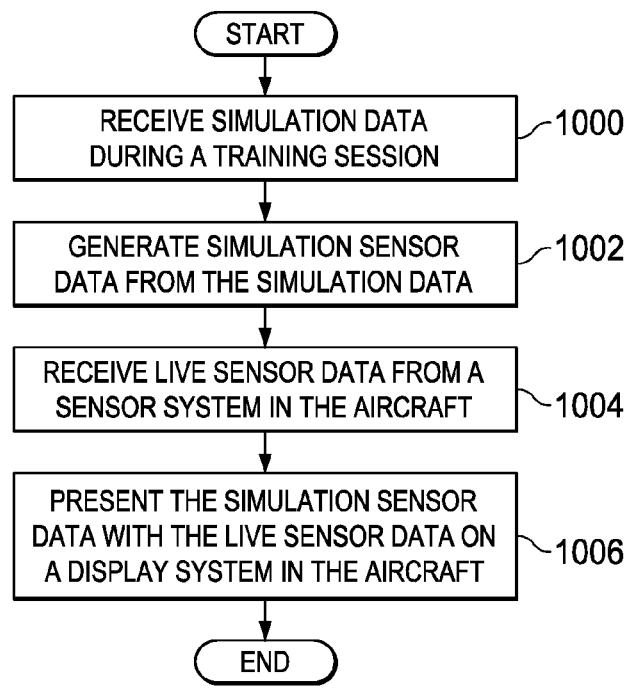
FIG. 10 is an illustration of a flowchart of a process for training in an aircraft in accordance with an illustrative embodiment.

With reference now to FIG. 10, an illustration of a flowchart of a process for training in an aircraft is depicted in accordance with an illustrative embodiment. The process in FIG. 10 may be implemented in a training environment, such as training environment 300 in FIG. 3. In particular, this process may be implemented in a computer system, such as computer system 118 in aircraft 104 in FIG. 1.

The process begins by receiving simulation data during a training session (operation 1000). In this illustrative example, the simulation data is received by the training software running on the aircraft. The communications system uses a wireless communications link to receive the simulation data. The process then generates simulation sensor data from the simulation data (operation 1002). In these illustrative examples, this process is performed in the aircraft. In other illustrative embodiments, a portion of the training software may operate in another location with the simulation sensor data being transmitted to the aircraft.

The process receives live sensor data from a sensor system in the aircraft (operation 1004). The process then presents the simulation sensor data with the live sensor data on a display system in the aircraft (operation 1006), with the process terminating thereafter.

Figure 11:
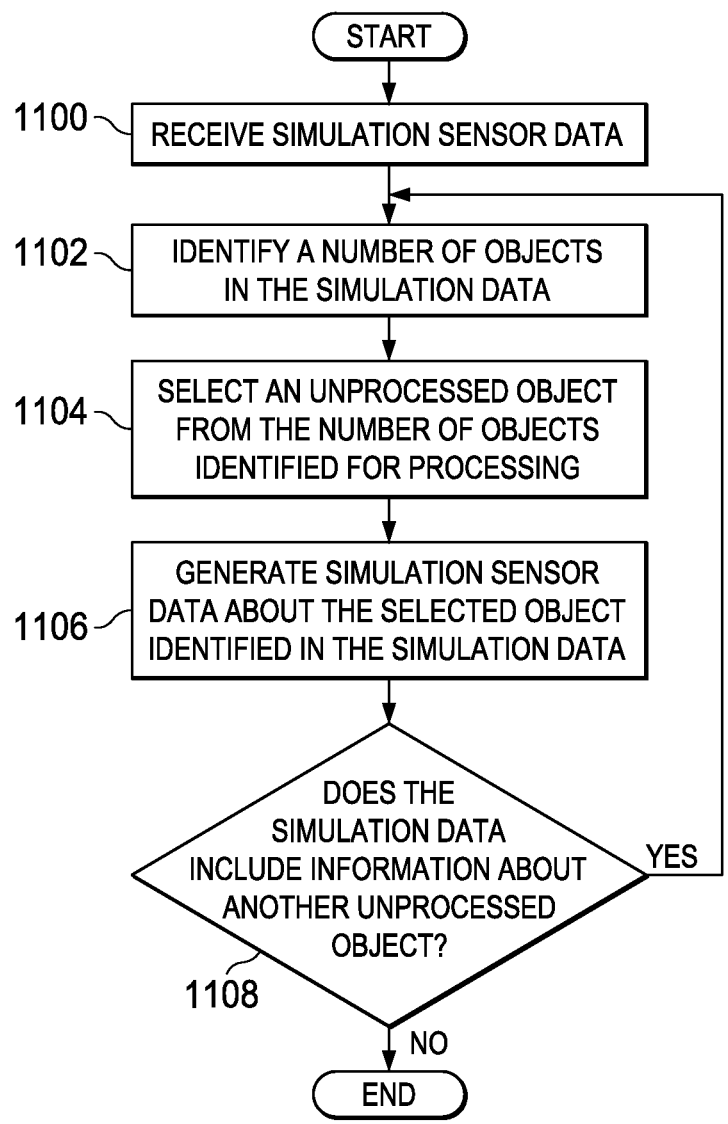
FIG. 11 is an illustration of a flowchart of a process for generating simulation sensor data received in an aircraft in accordance with an illustrative embodiment.

With reference now to FIG. 11, an illustration of a flowchart of a process for generating simulation sensor data received in an aircraft is depicted in accordance with an illustrative embodiment. The process illustrated in FIG. 11 may be implemented in software, such as training software 600 in FIG. 6. The simulation sensor data generated by the operations in this flowchart may be an example of simulation sensor data 647, which may be used to generate simulation object data 648 in FIG. 6.

The process begins by receiving simulation sensor data (operation 1100). The process identifies a number of objects in the simulation sensor data (operation 1102). The process then selects an unprocessed object from the number of objects identified for processing (operation 1104).

Thereafter, the process generates simulation sensor data about the selected object identified in the simulation data (operation 1106). This information may include, for example, without limitation, an identification of the object, a graphical indicator to use for the object, and other suitable information. These objects may be, for example, without limitation, aircraft, vehicles, missile sites, ships, missiles in flight, and other suitable objects.

Operation 1102 may be performed using a model for the sensor system. The model of the sensor system may include models of different sensors in the sensor system. Operation 1106 generates simulation sensor data in the same fashion that an actual sensor system would generate sensor data in an aircraft.

The sensor data is the same format as sensor data generated by physical sensor systems in the aircraft. A determination is then made as to whether the simulation data includes information about another unprocessed object (operation 1108). If the simulation data includes information about another unprocessed object, the unprocessed object is selected, and the process returns to operation 1102. Otherwise, the process terminates. The simulation sensor data may then be processed by the computer system in the aircraft in the same manner as with live sensor data generated by sensors for the aircraft.

Figure 12:
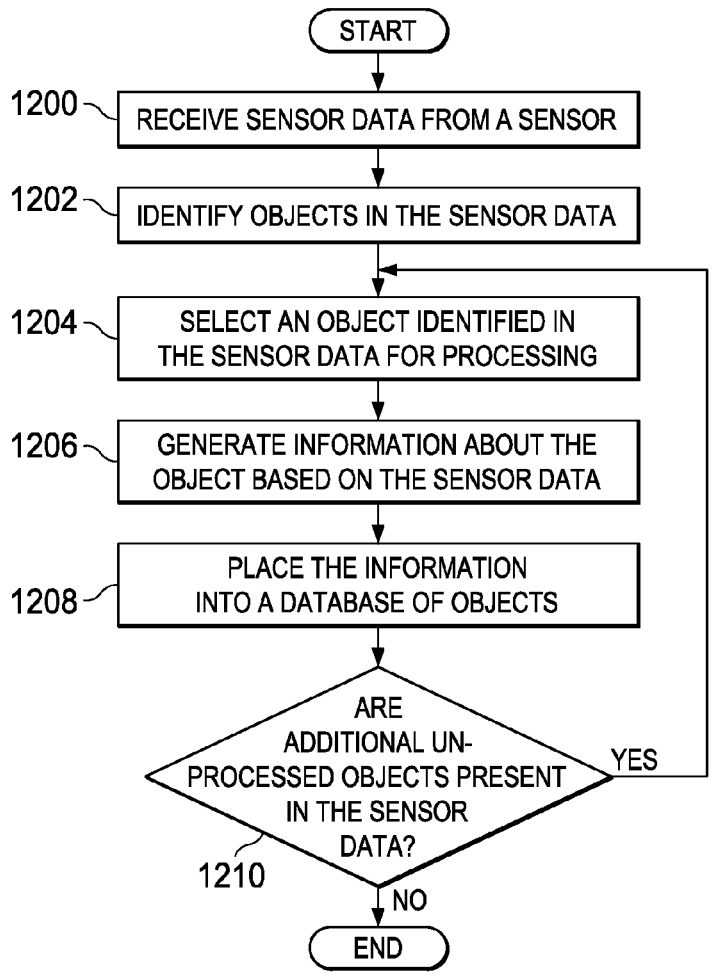
FIG. 12 is an illustration of a flowchart of a process for generating information about objects detected by sensors in accordance with an illustrative embodiment.

With reference now to FIG. 12, an illustration of a flowchart of a process for generating information about objects detected by sensors is depicted in accordance with an illustrative embodiment. The process illustrated in FIG. 12 may be implemented in software, such as training software 600 in FIG. 6.

This process may be used to generate information about both live objects and simulation objects in these illustrative examples. The same process may be used, because the simulation sensor data is in the same format and contains the same type of information as the live sensor data generated by physical sensors in the aircraft. The operations illustrated in FIG. 12 may be used to generate data, such as live object data 646 and simulation object data 648 in FIG. 6.

The process begins by receiving sensor data from a sensor (operation 1200). In operation 1200, the sensor data may be either live sensor data or simulation sensor data in these examples. The process then identifies objects in the sensor data (operation 1202). An object identified in the sensor data is selected for processing (operation 1204). Information about the object is generated based on the sensor data (operation 1206). This information may include, for example, an identification of the object, a graphical indicator to use for the object, and other suitable information. Thereafter, the information is placed into a database of objects (operation 1208). Next, a determination is made as to whether additional unprocessed objects are present in the sensor data (operation 1210). If additional unprocessed objects are present, the process returns to operation 1204. Otherwise, the process terminates.

With respect to simulation sensor data that may be received, the information about the object also may include an indication that the object is a simulation object rather than a live object. In some illustrative embodiments, parallel processes may run to process live sensor data and simulation sensor data. One process may process all live sensor data, while the other process processes only simulation sensor data. As a result, all of the objects identified by the process processing simulation sensor data are associated with objects that are simulation objects rather than live objects. The information for each type of object may be stored in separate locations such that an identification of a live object versus a simulation object may be made.

Figure 13:
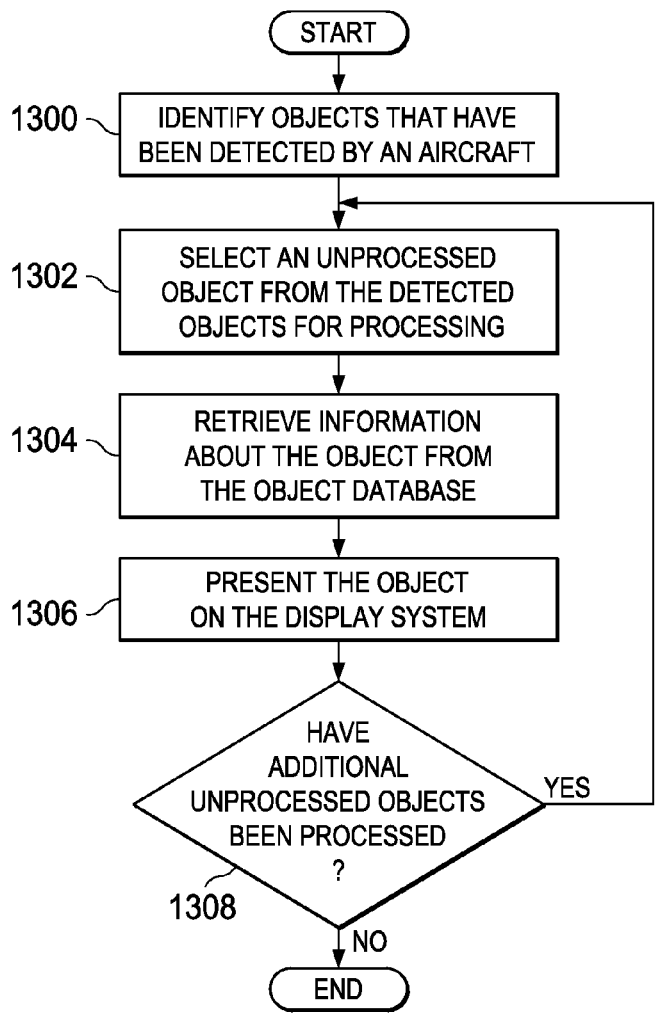
FIG. 13 is an illustration of a flowchart of a process for presenting object information in accordance with an illustrative embodiment.

With reference now to FIG. 13, an illustration of a flowchart of a process for presenting object information is depicted in accordance with an illustrative embodiment. The process illustrated in FIG. 13 may be used to process live object data and simulation object data generated by the process in FIG. 9.

The process begins by identifying objects that have been detected by an aircraft (operation 1300). These objects include ones detected by the sensors in the aircraft and those sent in simulation information to the aircraft. For example, the objects that are sent in the simulation information to the aircraft may be objects that have been identified as being visible in the field of view for the aircraft. The identification may be made using an object database, such as object database 650 in FIG. 6.

Thereafter, the process selects an unprocessed object from the detected objects for processing (operation 1302). The process retrieves information about the object from the object database (operation 1304). This information may include, for example, without limitation, an identification of the object, a location of the object, and other suitable information. The process then presents the object on the display system (operation 1306). For example, a particular type of graphical indicator may be used, depending on the identification of the object type. For example, one type of graphical indicator may be used for friendly aircraft, while another type of graphical indicator may be used for enemy aircraft.

As yet another example, one type of graphical indicator may be used for objects that are blocked in a field of view for an aircraft, while another type of graphical indicator may be used for objects that block a portion of the field of view for the aircraft.

The display of graphical indicators may be presented on display system 638 using number of video display devices 639 in FIG. 6. Additionally, in some cases, the operator or operators in the aircraft may receive audio cues through devices, such as number of audio devices 640 in display system 638 in FIG. 6. In the different illustrative embodiments, these audio cues also may be generated based on the reception of simulation data 610 in FIG. 6.

Next, the process determines whether additional unprocessed objects are present (operation 1308). If additional unprocessed objects are present, the process returns to operation 1302. Otherwise, the process terminates.

In selecting an object for processing in the process in FIG. 13, all objects in the object database are identified and processed. The objects include those for objects actually detected by the aircraft and those sent in the simulation information. In this manner, the presentation of objects, both live and simulated, are presented on the display in the same manner in which live objects are normally presented on the display. Of course, the presentation of the display may include a different indicator for simulation objects as compared to live objects, depending on the particular implementation.

Figure 14:
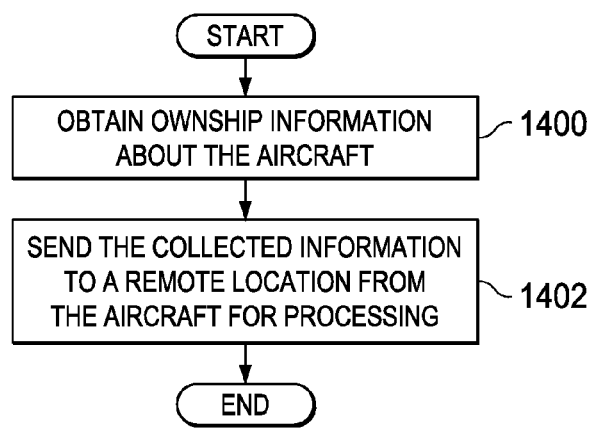
FIG. 14 is an illustration of a flowchart of a process for sending data during a training session in accordance with an illustrative embodiment.

With reference now to FIG. 14, an illustration of a flowchart of a process for sending data during a training session is depicted in accordance with an illustrative embodiment. The process illustrated in FIG. 14 may be implemented in a computer system, such as computer system 118 in aircraft 104 in FIG. 1.

The process begins by obtaining ownship information about the aircraft (operation 1400). This information may be obtained from a system, such as a global positioning system unit and/or an inertial navigation unit. This ownship information may include, for example, a longitude, a latitude, an elevation, an attitude, an altitude, a velocity, and other suitable information.

The ownship information also may include information about whether a control for launching a weapon has been activated. The process then sends the collected information to a remote location from the aircraft for processing (operation 1402), with the process terminating thereafter.

Figure 15:
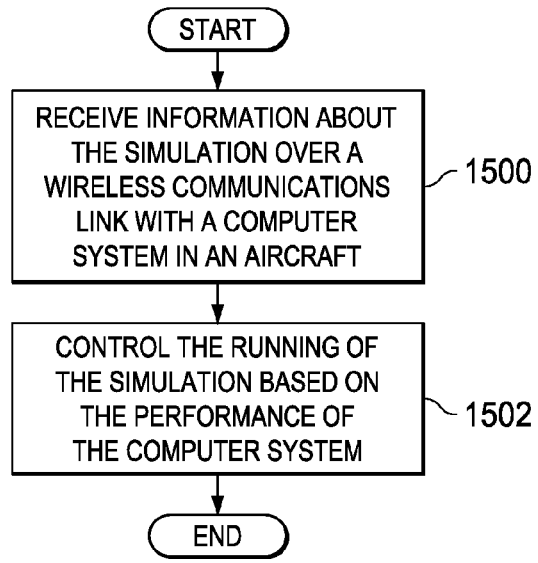
FIG. 15 is an illustration of a flowchart of a process for managing a simulation in accordance with an illustrative embodiment.

With reference now to FIG. 15, an illustration of a flowchart of a process for managing a simulation is depicted in accordance with an illustrative embodiment. The process illustrated in FIG. 15 may be implemented in simulation control process 502 in FIG. 5.

The process begins by receiving information about the simulation over a wireless communications link with a computer system in an aircraft (operation 1500). The information is received during the running of the simulation and identifies the performance of the computer system running the simulation.

Thereafter, the process controls the running of the simulation based on the performance of the computer system (operation 1502), with the process terminating thereafter.

Figure 16:
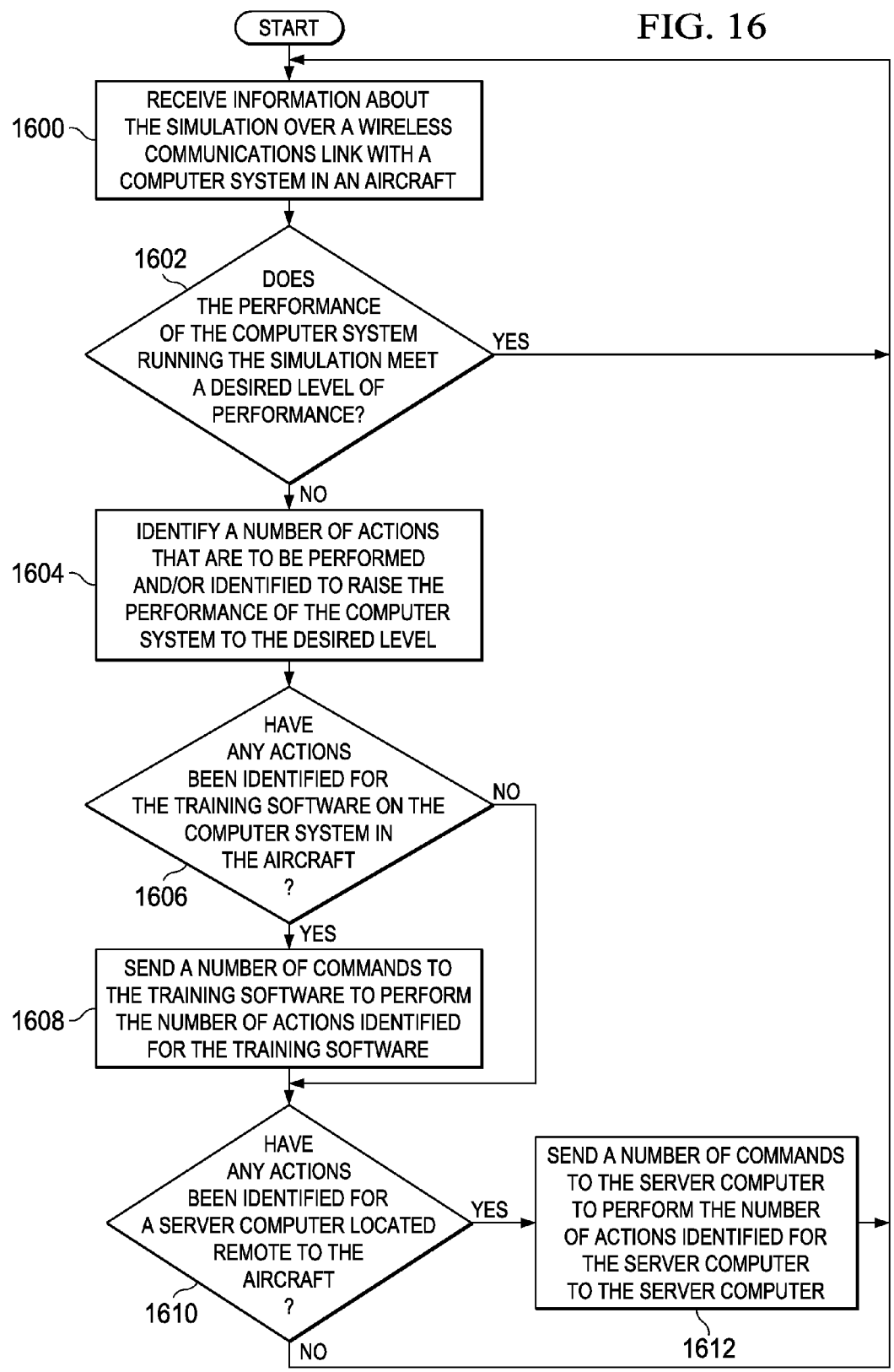
FIG. 16 is an illustration of a flowchart of a process for managing a simulation in accordance with an illustrative embodiment.

With reference now to FIG. 16, an illustration of a flowchart of a process for managing a simulation is depicted in accordance with an illustrative embodiment. The process illustrated in FIG. 16 may be implemented in simulation control process 502 in FIG. 5.

The process begins by receiving information about the simulation over a wireless communications link with a computer system in an aircraft (operation 1600). The information is received during the running of the simulation and identifies the performance of the computer system running the simulation. Training software on the computer system runs the simulation.

The process then determines whether the performance of the computer system running the simulation meets a desired level of performance (operation 1602). Operation 1602 may be performed using a policy, such as policy 524 in FIG. 5. In response to the performance of the computer system not meeting the desired level of performance, the process identifies a number of actions that are to be performed and/or identified to raise the performance of the computer system to the desired level (operation 1604).

In operation 1604, the number of actions may include any of the actions in number of actions 530 in FIG. 5. Further, number of actions may be identified for the training software on the computer system in the aircraft and/or a server computer located remote to the aircraft.

The process determines whether any actions have been identified for the training software on the computer system in the aircraft (operation 1606). If actions have been identified for the training software, the process sends a number of commands to the training software to perform the number of actions identified for the training software (operation 1608).

Thereafter, the process determines whether any actions have been identified for a server computer located remote to the aircraft (operation 1610). If actions have been identified for the server computer, the process sends a number of commands to the server computer to perform the number of actions identified for the server computer to the server computer (operation 1612). These actions may include, for example, reducing an amount of information for a number of objects sent to the computer system. Thereafter, the process returns to operation 1600 as described above.

With reference again to operation 1610, if actions have not been identified for the server computer, the process proceeds to operation 1600 as described above. With reference again to operation 1606, if actions have not been identified for the training software, the process proceeds to operation 1610. With reference again to operation 1602, if the performance of the computer system meets the desired level of performance, the process returns to operation 1600 as described above.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different illustrative embodiments provide a method and apparatus for training with aircraft. In one illustrative embodiment, an apparatus comprises an aircraft. The apparatus also comprises a communications system, a display system, a sensor system, and a computer system, all of which are associated with the aircraft. The communications system is configured to exchange data with a number of remote locations using a wireless communications link. The computer system is configured to run a number of processes to receive simulation data received through the communications system over the wireless communications link, receive live data from the sensor system associated with the aircraft, and present the simulation data and the live data on the display system.

Additionally, the different illustrative embodiments provide a method and apparatus for managing a simulation run by a training device during a training session. In the different illustrative embodiments, information is received about the simulation over a wireless communications link with a computer system in an aircraft. The information is received during the running of the simulation and identifies a performance of the computer running the simulation. The process then controls the running of the simulation based on the performance of the computer.

In the different illustrative embodiments, the management simulation occurs during the training session in which the simulation is run. In this manner, real-time management simulations may be performed in a manner that provides a desired level of performance for an operator of an aircraft involved in the simulation.

With one or more of the different illustrative embodiments, training using live aircraft may be reduced in expense and time. For example, with one or more of the different illustrative embodiments, multiple scenarios may be performed during a training session. For example, a first scenario may involve locating a ground target, and a second scenario may involve an air-to-air combat mission. These two scenarios may be performed during one training session more easily than with all live objects. For example, the scheduling and availability of aircraft and ground systems is less of a problem, because simulation objects may be used for one or more of the objects. Additionally, the amount of fuel and maintenance needed may be reduced because of the use of simulation objects in place of live objects.

The different illustrative embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different illustrative embodiments has been presented for purposes of illustration and description, and it is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a ground based simulator generating constructive data and virtual data;
    a network interface configured to communicate with a number of aircraft and the ground based simulator;
    a first computer system in communication with the ground based simulator configured to
        receive the constructive data and virtual data,
        generate simulation data, and
        transmit the simulation data to at least one aircraft in the number of aircraft;
    a second computer system in an aircraft in the number of aircraft, wherein the simulation data is received by the second computer system during running of the simulation and wherein the second computer system also sends information to the first computer system that identifies a performance of the second computer system running the simulation; the first computer system configured to control running of the simulation in the ground based simulator based on the performance of the second computer system in the aircraft, and wherein the ground based simulator further receives ownship information from the aircraft in the number of aircraft, the ownship information included in the simulation, wherein the apparatus is capable of operation while the number of aircraft are in flight.

2. The apparatus of claim 1, wherein in being configured to control running of the simulation based on the performance of the second computer system, the first computer system is configured to send a number of commands to the second computer system in the aircraft.

3. The apparatus of claim 2, wherein the number of commands changes resource usage by the second computer system in the aircraft.

4. The apparatus of claim 1, wherein the first computer system is configured to determine whether the performance of the second computer system meets a desired level of performance; and identify a number of actions in response to a determination that the performance of the second computer system does not meet the desired level of performance.

5. The apparatus of claim 4, wherein the number of actions includes at least one of changing operation of the second computer system, stopping the simulation run by training software on the second computer system, restarting the simulation, synchronizing the simulation with other computer systems, changing a number of objects managed by the training software, changing a number of models used by the training software, and reallocating resources used by the second computer system.

6. The apparatus of claim 1, wherein in being configured to control running of the simulation based on the performance of the second computer system, the first computer system is configured to change simulation data sent to the second computer system in the aircraft based on performance of resources used by the second computer system and to limit the amount of simulation data sent to the second computer system.

7. The apparatus of claim 6, wherein the simulation data comprises a number of objects in the simulation.

8. The apparatus of claim 1, wherein the first computer system is a simulation control server computer.

9. The apparatus of claim 1 further comprising:
a server computer, wherein the server computer is configured to send simulation data to the second computer system and receive a number of commands from the first computer system to change the simulation data for the simulation sent to the second computer system.

10. The apparatus of claim 1 further comprising:
the number of aircraft.

11. An aircraft training system comprising:
a number of aircraft, at least one computer in at least one aircraft;
a ground based simulator configured to generate virtual data and constructive data for a simulation;
a network interface configured to communicate with the number of aircraft and the ground based simulator;
a constructive server computer configured to generate simulation objects for a simulation based on the virtual data and the constructive data and send simulation data including the simulation objects to the number of aircraft and the ground based simulator using the network interface; and
a simulation control server computer configured to receive information from the at least one computer in the number of aircraft about the simulation over a wireless communications link to the network interface with the computer system in an aircraft in the number of aircraft, wherein the information is received during running of the simulation and identifies a performance of the computer system running the simulation in the aircraft, and control running of the simulation on the computer in the aircraft based on the performance of the computer system, control including controlling the amount of simulation data sent to the at least one computer, and wherein the ground based simulator further receives ownship information from the aircraft in the number of aircraft, the ownship information included in the simulation, wherein the system is capable of operation while the number of aircraft are in flight.

12. The aircraft training system of claim 11 further comprising:
a weapons server computer configured to simulate a flight of a weapon, simulate a detonation of the weapon, and determine whether damage has been done to a target by the weapon.

13. The aircraft training system of claim 11 further comprising:
a number of flight simulators configured to receive the simulation data and ownship information from at least one aircraft, wherein the constructive server computer is configured to send the simulation data and ownship information to the number of flight simulators and wherein the simulation control server is configured to control running of another simulation running on a flight simulator in the number of flight simulators based on the performance of the flight simulator.

14. A method for managing a simulation, the method comprising:
receiving ownship information and information about the simulation over a wireless communications link with a computer system in an aircraft, wherein the information is received during running of the simulation and identifies a performance of the computer system in the aircraft running the simulation, the information about the simulation received at a control computer system;
providing the ownship information and the information about the simulation to a ground based simulator;
receiving simulation data from the ground based simulator at the control computer system; and
controlling the running of the simulation based on the performance of the computer system in the aircraft, the simulation coordinated at both the aircraft and the ground based simulator, controlling including sending a number of commands to the computer system in the aircraft the controlling the amount of simulation data sent to the computer system in the aircraft, and wherein the method is capable of operation while the aircraft is in flight.

15. The method of claim 14, wherein the number of commands changes resource usage by the computer system in the aircraft.

16. The method of claim 14, wherein the number of commands causes at least one of changing operation of the computer system, stopping the simulation run by training software on the computer system, restarting the simulation, synchronizing the simulation with other computer systems, changing a number of objects managed by the training software, changing a number of models used by the training software, and reallocating resources for the computer system.

17. The method of claim 14, wherein the controlling step comprises:
changing simulation data sent to the computer system based on the performance of the computer system.

18. The method of claim 17, wherein the simulation data comprises a number of objects in the simulation.

19. The method of claim 14, wherein the information comprises a number of objects tracked, processing times for models, processor use, memory use, and network use.

* * * * *